US012067497B2

(12) United States Patent
Pedersen

(10) Patent No.: US 12,067,497 B2
(45) Date of Patent: *Aug. 20, 2024

(54) DISTRIBUTED ACTIVITY CONTROL SYSTEMS FOR ARTIFICIAL INTELLIGENCE TASK EXECUTION DIRECTION INCLUDING TASK ADJACENCY AND REACHABILITY ANALYSIS

(71) Applicant: Robert D. Pedersen, Dallas, TX (US)

(72) Inventor: Robert D. Pedersen, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,508

(22) Filed: Oct. 14, 2022

(65) Prior Publication Data

US 2023/0030357 A1 Feb. 2, 2023

Related U.S. Application Data

(63) Continuation of application No. 17/727,558, filed on Apr. 22, 2022, now Pat. No. 11,507,852, which is a (Continued)

(51) Int. Cl.
*G06N 5/02* (2023.01)
*G06F 9/48* (2006.01)
(Continued)

(52) U.S. Cl.
CPC ............ *G06N 5/02* (2013.01); *G06F 9/4843* (2013.01); *G06F 9/5027* (2013.01); *H04L 67/10* (2013.01)

(58) Field of Classification Search
CPC .... G06F 9/4843; G06F 9/5027; G06F 9/5037; G06N 5/02; H04L 67/10
(Continued)

(56) References Cited

U.S. PATENT DOCUMENTS 3,662,401 A 5/1972 Collins et al.
4,852,001 A 7/1989 Tsushima et al.
(Continued)

OTHER PUBLICATIONS

Collins, et al.; "Telecommunications—A Time for Innovation"; no month, 1973; Chapter 7; Merle Collins Foundation; Dallas, Texas.
(Continued)

*Primary Examiner* — Ted T. Vo
(74) *Attorney, Agent, or Firm* — Steven R. Pedersen

(57) ABSTRACT

A dynamic, distributed directed activity network comprising a directed activity control program specifying tasks to be executed including required individual task inputs and outputs, the required order of task execution, permitted parallelism in task execution, task adjacency to subsequent tasks, and reachability from each task to other tasks; a plurality of task execution agents, individual of said agents having a set of dynamically changing agent attributes and capable of executing different required tasks; a plurality of task execution controllers, each controller associated with one or more of the task execution agents with access to dynamically changing agent attributes; a directed activity controller for communicating with said task execution controllers for directing execution of said activity control program; and, a communications network supporting communication between said directed activity controller and task execution controllers for directing execution of said directed activity control program using selected task execution agents.

20 Claims, 15 Drawing Sheets

Related U.S. Application Data continuation of application No. 17/204,674, filed on Mar. 17, 2021, now Pat. No. 11,341,421, which is a continuation of application No. 16/737,731, filed on Jan. 8, 2020, now Pat. No. 10,984,325, which is a continuation of application No. 16/280,451, filed on Feb. 20, 2019, now Pat. No. 10,565,507, which is a continuation of application No. 15/979,350, filed on May 14, 2018, now Pat. No. 10,565,505, which is a continuation of application No. 15/274,635, filed on Sep. 23, 2016, now Pat. No. 9,996,796, which is a continuation of application No. 14/489,974, filed on Sep. 18, 2014, now Pat. No. 9,477,519.

(51) Int. Cl.
*G06F 9/50* (2006.01)
*H04L 67/10* (2022.01)

(58) Field of Classification Search
USPC .................................. 706/46; 718/100, 102
See application file for complete search history.

(56) References Cited

U.S. PATENT DOCUMENTS

| | | |
|---|---|---|
| 5,301,320 A | 4/1994 | McAtee |
| 5,745,687 A | 4/1998 | Randell |
| 5,768,506 A | 6/1998 | Randell |
| 5,958,071 A | 9/1999 | Iida et al. |
| 6,334,137 B1 | 12/2001 | Iida et al. |
| 6,636,884 B2 | 10/2003 | Iida et al. |
| 7,024,669 B1 | 4/2006 | Leymann et al. |
| 7,693,486 B2 | 4/2010 | Kasslin |
| 8,595,824 B2 | 11/2013 | Albrecht-Buehler |
| 8,826,175 B2 | 9/2014 | Wallis |
| 9,477,519 B2 | 10/2016 | Pedersen |
| 9,996,796 B2 | 6/2018 | Pedersen |
| 10,565,505 B2 | 2/2020 | Pedersen |
| 10,565,507 B2 | 2/2020 | Pedersen |
| 10,984,325 B2 | 4/2021 | Pedersen |
| 11,341,421 B2 * | 5/2022 | Pedersen ............... G06F 9/5027 |
| 11,507,852 B2 * | 11/2022 | Pedersen ............... G06F 9/5027 |
| 2012/0246650 A1 | 9/2012 | Mueller |
| 2018/0365566 A1 | 12/2018 | Pedersen |
| 2021/0201166 A1 | 7/2021 | Pedersen |

OTHER PUBLICATIONS

Chaudhuir et al.; Parallel Algorithms for analyzing Activity Networks, 1986, BIT Numerical Mathematics, vol. 26, Issue 4, pp. 418-429.

* cited by examiner

FIG. 3

TASK EXECUTION AGENT EXAMPLES:

- COMPUTERS
- STORAGE UNITS
- TRANSPORTATION EQUIPMENT
- MANUFACTURING EQUIPMENT
- FACTORIES
- PERSONEL
- COMMUNICATIONS EQUIPMENTS

301

EXECUTION AGENT ATTRIBUTE EXAMPLES:

- CAPABILITY
- CAPACITY
- SPEED
- AVAILABILITY/UTILIZATION
- LOCATION
- QUANTITY
- COST

302

TASK EXECUTION CONTROLLER EXAMPLES:

- COMPUTERS
- CONTROLLERS
- PERSONEL
- COMMUNICATION DEVICES
- TIMERS
- SENSORS

303

DIRECTED ACTIVITY CONTROLLER EXAMPLES:

- COMPUTERS
- ELECTRONIC CONTROLLERS
- COMPUTER SOFTWARE
- PERSONEL

304

COMMUNICATION EQUIPMENT EXAMPLES:

- RADIO EQUIPMENT/NETWORKS
- FIBER OPTIC NETWORKS
- INTERNET
- WORLD WIDE WEB
- SWITCHNG SYSTEMS
- WIRELESS COMMUNICATION DEVICES

305

ACTIVITY OPTIMIZATION TOOL EXAMPLES:

- EXPERT SYSTEMS
- GRAPH THEORY
- FUZZY LOGIC
- MATRIX THEORY
- STATISTICS
- PROBABILTY THEORY

306

FIG. 5 TASK EXECUTION CONTROLLER

| AGENT NO. | CAPABILITY | CAPACITY | SPEED | AVAILABILITY | UTILIZATION | LOCATION | QUANTITY | COST |
|---|---|---|---|---|---|---|---|---|

| AGENT DESCRIPTION | AGENT 1 | AGENT 2 | AGENT 3 | AGENT 4 |
|---|---|---|---|---|
| CAPABILITY | Cargo airplanes | Factory workers | Data storage | Computer |
| CAPACITY | 2000 pounds | 5 assembly lines | 100 terabyte | 20 terabyte |
| SPEED | 400 mph | 5 Units/Hr. | 10 Mb per second | Ten gigaflops |
| AVAILABLITY | December 10-20 | 8-5 weekdays | 24/7 | 24/7 |
| UTILIZATION | 60% | 40% | 20% | 30% |
| LOCATION | Dallas TX (GPS) | India (GPS) | Cloud | Denver Co. (GPS) |
| QUANTITY | Three | 50 | 10 units | 15 mainframes |
| COST | 2 | 4 | 3.5 | 2.75 |

| COST / TIME | VERY LOW | LOW | MEDIUM | HIGH | VERY HIGH |
|---|---|---|---|---|---|
| VERY LOW | VERY HIGH | HIGH | MEDIUM | LOW | LOW |
| LOW | HIGH | MEDIUM | MEDIUM | LOW | VERY LOW |
| MEDIUM | MEDIUM | MEDIUM | MEDIUM | LOW | VERY LOW |
| HIGH | MEDIUM | LOW | LOW | VERY LOW | VERY LOW |
| VERY HIGH | LOW | LOW | LOW | VERY LOW | VERY LOW |

DISPATCH TASK INDEX

|   | A | B | C | D | E | F | G | H |
|---|---|---|---|---|---|---|---|---|
| A | 0 | 1 | 1 | 0 | 0 | 0 | 0 | 0 |
| B | 0 | 0 | 0 | 0 | 0 | 1 | 0 | 0 |
| C | 0 | 0 | 0 | 1 | 1 | 0 | 0 | 0 |
| D | 0 | 0 | 0 | 0 | 0 | 0 | 0 | 1 |
| E | 0 | 0 | 0 | 0 | 0 | 0 | 1 | 1 |
| F | 0 | 0 | 0 | 0 | 0 | 0 | 1 | 0 |
| G | 0 | 0 | 0 | 0 | 0 | 0 | 0 | 0 |
| H | 0 | 0 | 0 | 0 | 0 | 0 | 1 | 0 |

1501

$A^2(D) =$

|   | A | B | C | D | E | F | G | H |
|---|---|---|---|---|---|---|---|---|
| A | 0 | 0 | 0 | 1 | 1 | 1 | 0 | 0 |
| B | 0 | 0 | 0 | 0 | 0 | 0 | 1 | 0 |
| C | 0 | 0 | 0 | 0 | 0 | 0 | 1 | 2 |
| D | 0 | 0 | 0 | 0 | 0 | 0 | 1 | 0 |
| E | 0 | 0 | 0 | 0 | 0 | 0 | 1 | 0 |
| F | 0 | 0 | 0 | 0 | 0 | 0 | 0 | 0 |
| G | 0 | 0 | 0 | 0 | 0 | 0 | 0 | 0 |
| H | 0 | 0 | 0 | 0 | 0 | 0 | 0 | 0 |

1502

$A^3(D) =$

|   | A | B | C | D | E | F | G | H |
|---|---|---|---|---|---|---|---|---|
| A | 0 | 0 | 0 | 0 | 0 | 0 | 1 | 2 |
| B | 0 | 0 | 0 | 0 | 0 | 0 | 0 | 0 |
| C | 0 | 0 | 0 | 0 | 0 | 0 | 2 | 0 |
| D | 0 | 0 | 0 | 0 | 0 | 0 | 0 | 0 |
| E | 0 | 0 | 0 | 0 | 0 | 0 | 0 | 0 |
| F | 0 | 0 | 0 | 0 | 0 | 0 | 0 | 0 |
| G | 0 | 0 | 0 | 0 | 0 | 0 | 0 | 0 |
| H | 0 | 0 | 0 | 0 | 0 | 0 | 0 | 0 |

1503

$A^4(D) =$

|   | A | B | C | D | E | F | G | H |
|---|---|---|---|---|---|---|---|---|
| A | 0 | 0 | 0 | 0 | 0 | 0 | 2 | 0 |
| B | 0 | 0 | 0 | 0 | 0 | 0 | 0 | 0 |
| C | 0 | 0 | 0 | 0 | 0 | 0 | 0 | 0 |
| D | 0 | 0 | 0 | 0 | 0 | 0 | 0 | 0 |
| E | 0 | 0 | 0 | 0 | 0 | 0 | 0 | 0 |
| F | 0 | 0 | 0 | 0 | 0 | 0 | 0 | 0 |
| G | 0 | 0 | 0 | 0 | 0 | 0 | 0 | 0 |
| H | 0 | 0 | 0 | 0 | 0 | 0 | 0 | 0 |

|   | A | B | C | D | E | F | G | H |
|---|---|---|---|---|---|---|---|---|
| A | 0 | 1 | 1 | 1 | 1 | 1 | 1 | 1 |
| B | 0 | 0 | 0 | 0 | 0 | 1 | 1 | 0 |
| C | 0 | 0 | 0 | 1 | 1 | 0 | 1 | 1 |
| D | 0 | 0 | 0 | 0 | 0 | 0 | 1 | 1 |
| E | 0 | 0 | 0 | 0 | 0 | 0 | 1 | 1 |
| F | 0 | 0 | 0 | 0 | 0 | 0 | 1 | 0 |
| G | 0 | 0 | 0 | 0 | 0 | 0 | 0 | 0 |
| H | 0 | 0 | 0 | 0 | 0 | 0 | 1 | 0 |

1601

DIRECTED ACTIVITY PRECEDENCE MATRIX

|   | TIME |
|---|------|
| A | 3 |
| B | 6 |
| C | 10 |
| D | 7 |
| E | 8 |
| F | 4 |
| G | 6 |
| H | 3 |

1602

TASK EXECUTION TIME VECTOR

|   | TIME |
|---|------|
| A | 44 |
| B | 10 |
| C | 24 |
| D | 9 |
| E | 9 |
| F | 6 |
| G | 0 |
| H | 6 |

1603

TIME INDEX VECTOR

DISTRIBUTED ACTIVITY CONTROL SYSTEMS FOR ARTIFICIAL INTELLIGENCE TASK EXECUTION DIRECTION INCLUDING TASK ADJACENCY AND REACHABILITY ANALYSIS

CROSS-REFERENCE TO RELATED APPLICATIONS

This application is a continuation of U.S. Ser. No. 17/727,558 filed on Apr. 22, 2022, which is a continuation of Ser. No. 17/204,674 filed Mar. 17, 2021 and issued under U.S. Pat. No. 11,341,421 on May 24, 2022, which is a continuation of U.S. Ser. No. 16/737,731 filed Jan. 8, 2020, now issued under U.S. Pat. No. 10,984,325 on Apr. 20, 2021, which is a continuation of Ser. No. 16/280,451 filed on Feb. 20, 2019, issued on Feb. 18, 2020 under U.S. Pat. No. 10,565,507, which is a continuation of Ser. No. 15/979,350 filed on May 14, 2018, issued on Feb. 18, 2020 under U.S. Pat. No. 10,565,505, which is a continuation of Ser. No. 15/274,635 filed Sep. 23, 2016, issued on Jun. 12, 2018 under U.S. Pat. No. 9,996,796, which is a continuation of U.S. Ser. No. 14/489,974 filed Sep. 18, 2014, issued on Oct. 25, 2016 under U.S. Pat. No. 9,477,519, all of which are incorporated herein by reference.

BACKGROUND OF THE INVENTION

Many activities depend on interrelated tasks wherein individual tasks must be completed before others may be initiated. Furthermore, it is often the case that individual tasks produce outputs that subsequent tasks must have for execution. Some tasks may proceed in parallel while others require serial execution. Some tasks may be performed by anyone of a number of operators, while others may require the use of one or more particular operators for execution. In the most general terms, individual operators include a wide range of possibilities such as persons, computers, communications devices, manufacturing mechanisms and transportation equipment. Often adjustments must be made in execution strategies as the activity proceeds to accommodate unforeseen or unanticipated events or results. Dynamic strategy adjustment to compensate for such occurrences is important.

Prior art systems and methods for directed activity control were pioneered in the 1960 and 1970s at Collins Radio Company. See Arthur A. Collins and Wesley B. Henry, U.S. Pat. No. 3,662,401, Method of Program Execution, May 9, 1972. See also Arthur A. Collins and Robert D. Pedersen, "Telecommunications—A Time for Innovation," Merle Collins Foundation, 1972, esp. Chapter 7.

Tsushima et. al., U.S. Pat. No. 4,852,001, "Job Scheduling System and Method," assigned to Hitachi, is directed to scheduling of job allocation to various resources with workload balancing within resource capabilities. Ilda et. al., U.S. Pat. Nos. 5,958,071, 6,334,137 and 6,636,884, "Method and System for Controlling Parallel Execution of Jobs," also assigned to Hitachi, are directed to a computer system with parallel job execution control.

Randell, U.S. Pat. No. 5,745,687, "System for Distributed Workflow in which a Routing Node Selects Next Node to be Performed within a Workflow Procedure," and U.S. Pat. No. 5,768,506, "Method and Apparatus for Distributed Workflow Building Blocks of Process Definition, Initialization and Execution," both assigned to Hewlett-Packard, are directed to a workflow system that automates the definition and execution of a procedure that can be carried out according to defined rules among agents were in the individual activities are taken in a defined sequence, form, and time.

Leymann et. al., U.S. Pat. No. 7,024,669, "Managing Workload within Workflow—Management-Systems," as signed to International Business Machines Corporation (IBM), is directed to a computerized method of managing workload within a workflow-management-system (WFMS) were in the WFMS may be modeled as a directed graph defining potential control flow within the process model. Tasks in the WFMS may be executed on a priority basis according to a priority execution indicator.

However, none of these systems disclose implementation of a distributed, dynamic directed activity control system and method with distributed execution agents monitoring and control and communication with directed activity controllers as described herein. The prior art systems lack the operational advantages of such of such distributed implementation with integrated communication control and dynamic optimization of execution strategies.

What is needed are systems and methods that expand control options and improve the efficiency of execution of interrelated activities based on distributed control and communication technologies while accommodating various dynamically changing system attributes as described above.

SUMMARY OF THE INVENTION

Various embodiments of a system and method for improved dynamic control of distributed interrelated activities are disclosed. In one embodiment, a dynamic directed activity network comprises a directed activity control program specifying tasks to be executed including required individual task inputs and outputs, the required order of task execution, and permitted parallelism in task execution; a directed activity controller for executing the directed activity control program; a plurality of distributed task execution agents, individual of said task execution agents having a set of agent attributes and capable of executing different tasks in said activity network; a plurality of task execution controllers, each task execution controller associated with one or more of the task execution agents with access to agent attributes which may dynamically change over time; and wherein said task execution controllers and directed activity controllers execute said directed activity control program using selected task execution agents with dynamic updating of task execution agent attributes by communications between task execution controllers and the directed activity controller.

In a further aspect of the invention, the task execution agents comprise computers, storage units, transportation equipment, manufacturing equipment, factories, personnel and/or communications equipment.

In still a further aspect of the invention, the task execution agent attributes comprise agent capabilities, capacity, speed, availability, utilization, location and/or quantity.

In still a further aspect of the invention, the task execution controllers comprise computers, digital controllers, personnel, communication devices, timers and/or sensors.

In still a further aspect of the invention, the task execution controllers comprise one or more of a GPS receiver, cellular transceiver, barcode reader, RFID tag reader, RF tag reader, data transceiver, optical transceiver, optical camera, Bluetooth transceiver, Wi-Fi transceiver, weather/alert transceiver, time/clock distribution and/or speech/text conversion.

In still a further aspect of the invention, the directed activity controller and distributed task execution controllers communicate via a communications network.

In still a further aspect of the invention, the communications network comprises one or more of the following: voice networks, data networks, Internet, World Wide Web, wireless networks, radio networks, TV networks and broadcast networks, wire-line, cable, wireless or fiber optic network and transmission and switching equipment.

In still a further aspect of the invention, the execution of said directed activity control program using selected task execution agents comprises use of optimization tools including, for example, graph theory, artificial intelligence, mathematical analysis, expert system implementation, fuzzy logic, probability theory, statistics and task scheduling to optimize activity network execution time.

In still a further aspect of the invention, the activities comprise defined operations on objects, work pieces or materials.

In still a further aspect of the invention, the materials or objects carry identification information.

In still a further aspect of the invention, the identification information comprises bar codes, RFID tags, or toll tags.

In another embodiment, a method for dynamic, distributed directed activity network control comprises the steps of: formulating a directed activity control program specifying tasks to be executed including required individual task inputs and outputs, the required order of task execution, and permitted parallelism in task execution; operating a directed activity controller for executing the directed activity control program; providing a plurality of distributed task execution agents, individual of said task execution agents having a set of agent attributes and capable of executing different required tasks in said activity network; operating a plurality of task execution controllers, each task execution controller associated with one or more of the task execution agents with access to agent attributes which may dynamically change over time; wherein said task execution controllers and directed activity controllers execute said directed activity control program using selected task execution agents with dynamic updating of task execution agent attributes by communications between task execution controllers and the directed activity controller.

In a further aspect of the invention, the method further comprises the step of providing a communications network capable of supporting communication between said directed activity controller and distributed task execution controller.

In a further aspect of the invention, the dynamic updating of task execution results in task execution attributes forming inputs to an expert system analysis to determine which tasks to execute using particular task execution agent resources.

In a further aspect of the invention, expert system analysis comprises the use of fuzzy logic.

In a further aspect of the invention, fuzzy logic analysis is used to derive task dispatch indices indicative of suitability of individual task execution agent resources for the execution of selected tasks.

These and other aspects of this invention are set forth below in more detail descriptions of the drawings and implementation of the dynamic, distributed in activity control system and method.

BRIEF DESCRIPTION OF THE DRAWINGS

While the invention is amenable to various modifications and alternative forms, specific embodiments thereof are shown by way of example in the drawings and will herein be described in detail. The inventions of this disclosure are better understood in conjunction with these drawings and detailed description of the preferred embodiments. The various hardware and software elements used to carry out the inventions are illustrated in these drawings in the form of block diagrams, flowcharts and descriptive tables setting forth aspects of the operations of the invention.

It should be understood, however, that the drawings and detailed descriptions are not intended to limit the invention to the particular form disclosed, but on the contrary, the intention is to cover all modifications, equivalents and alternatives falling within the spirit and scope of the present invention as defined by the appended claims.

FIG. 3 lists, without limitation, various exemplary elements of the overall dynamic directed activity control system including task execution agent examples, task execution agent attributes, task execution controller examples, directed activity controller examples, and optimization tools and methods useful in the operation of the overall directed activity control system.

FIG. 9 illustrates, without limitation, a typical task execution message format for a message communicated between a task execution agent and a dynamic directed activity controller in the directed activity control system.

FIG. 10 illustrates, without limitation, an exemplary, partial database at the task execution controller compiling dynamically changing information received from the task execution agents concerning capabilities of the various agents throughout the directed activity system.

FIG. 11 illustrates, without limitation, an exemplary fuzzy logic implementation and calculation used for selecting particular task execution agents from the many available such agents that may be used to execute particular tasks depending on the state of those agents.

FIG. 15 illustrates, without limitation, digraph adjacency matrices useful in assigning tasks to individual task execution agents.

FIG. 16 illustrates, without limitation, an exemplary reachability matrix for use with task execution time vectors to derive time index vectors useful in assigning individual tasks to task execution agents.

DETAILED DESCRIPTION

The above figures are better understood in connection with the following detailed description of the preferred embodiments.

Figure 1:
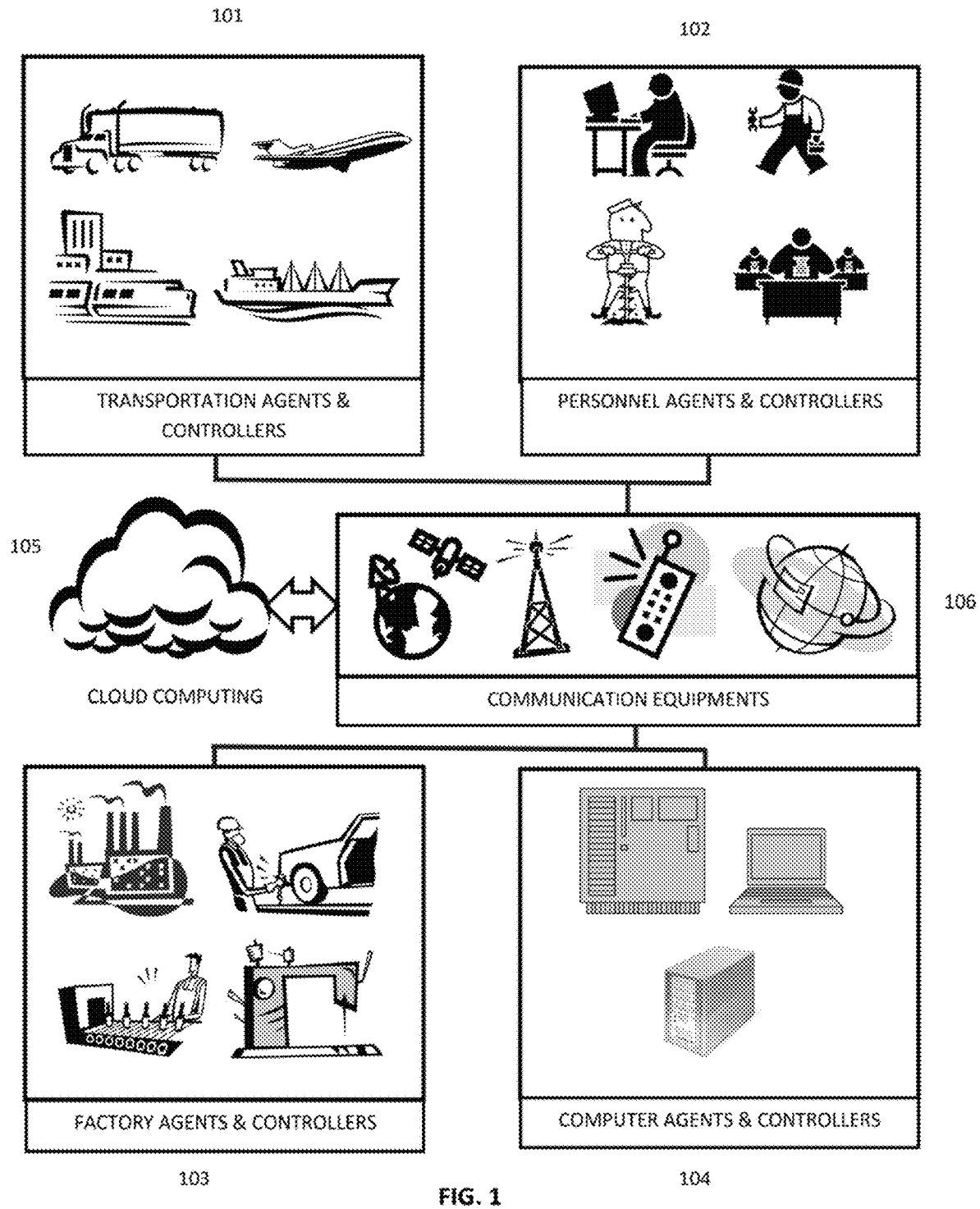
FIG. 1 depicts, without limitation, in graphic form exemplary elements of the dynamic directed activity control system and method including example task execution agents and their controllers with interconnection of those agents and the directed activity control computers via various forms of communication equipment and networks, and also illustrates interconnection of the dynamic directed activity control system elements with cloud computing and/or storage elements via the World Wide Web.

FIG. 1 depicts in graphical form exemplary elements of the dynamic, distributed directed activity control system and method of this patent. The overall system is described in terms of various agents and controllers for those agents interconnected via communication equipment and networks to network computing elements. Illustrated in the figure are transportation agents and controllers (101) including for example trucks, airplanes, trains and ships. These various transportation agents are used in the present invention to move physical materials from one location to another as required in the overall dynamic directed activity control system and method. Individual controllers associated with one or more transportation agents (101) communicate current status and capability of the individual transportation agents to the dynamic directed activity control system computer agents used to direct execution of the overall dynamic directed activity.

Also shown in FIG. 1 are exemplary personnel agents and controllers (102) representing human resources that may be required in the execution of the overall dynamic directed activity control system and method. Illustrated in FIG. 1 are exemplary but not limiting human resources such as office workers, factory workers, laborers and laboratory research personnel.

FIG. 1 also depicts factory agents and controllers (103) that may be required in the execution of individual tasks of the dynamic directed activity control system and method of this invention. Exemplary, but not necessarily limiting, examples of such factory agents include the factories themselves, assembly line workers, inspectors and various factory machinery that may be a necessary to execute individual tasks.

FIG. 1 also includes computer agents and controllers (104) including for example mainframe computers, desktop computers, portable computers and other types of computers and controllers. Such computer agents may also include computational capabilities of various handheld devices including cellular smart phones and tablet computers.

Telecommunication networks and equipment (106) include without limitation various forms of radio, wireline, fiber-optic, satellite and interconnected networks. Telecommunication networks useful in this invention may also include remote shared computing and storage elements such as cloud computing (105) as illustrated in FIG. 1. Cloud computing refers to a large number of computers connected through a real-time communication network such as the Internet. Cloud computing is a synonym for distributed computing over a network, with the ability to run a program or application on many connected computers at the same time.

Figure 2:
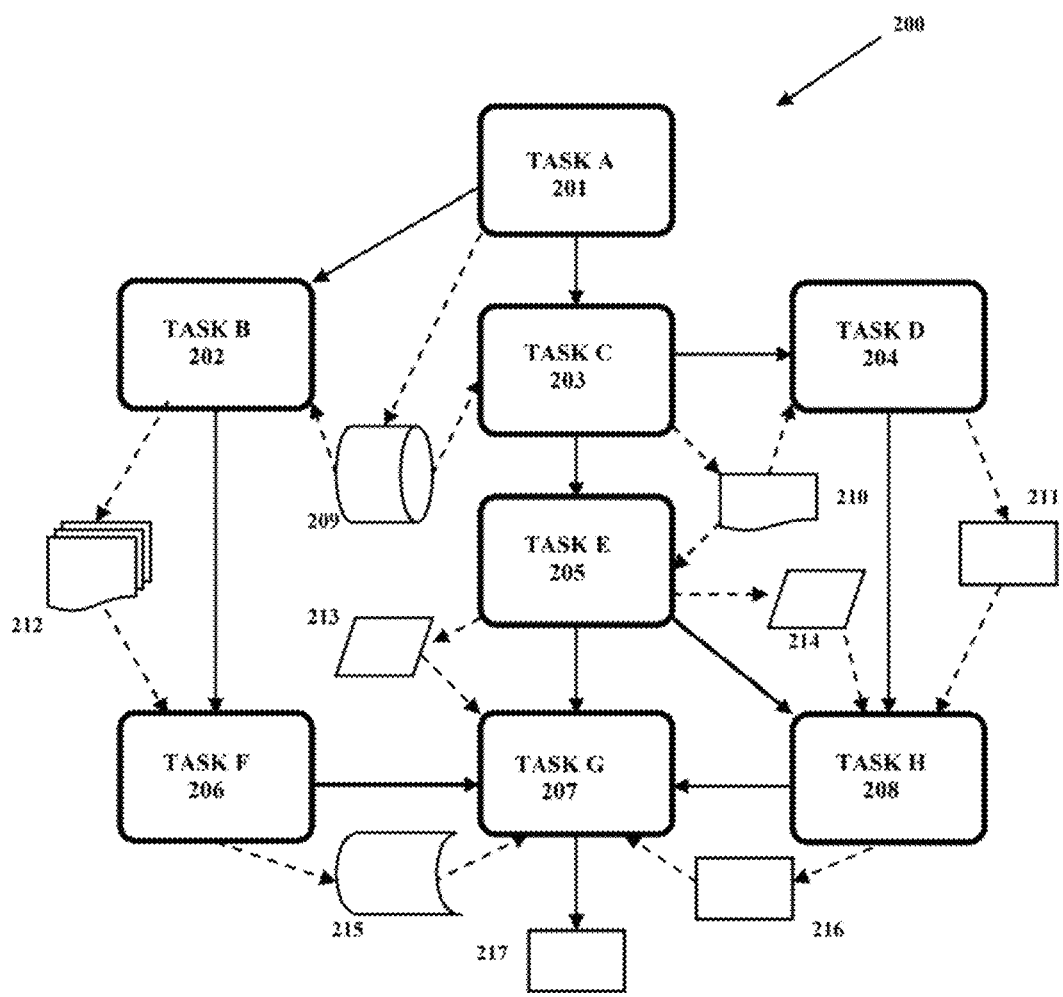
FIG. 2 illustrates, without limitation, an exemplary dynamic directed activity control network comprising individual tasks A through H with task precedence relationships indicated by arrows interconnecting the tasks and various outputs from the individual tasks indicated and the required use of those outputs in subsequent tasks in the entire directed activity network as described.

FIG. 2 depicts a control program for a particular directed activity as embodied in this invention. The activity consists of tasks A through H with interaction and precedence relationships between the tasks being depicted by arrows interconnecting the various tasks. For example, task A (201) is the first task in the directed activity. Task A (201) must be executed before any of the other tasks in the total activity. More particularly, task A must be executed before task B (202) or task C (203) can be initiated. Furthermore, the output from task A (201) indicated by item (209) in FIG. 2 is required as inputs for task B (202) and task C (203). For example, item (209) may be a data file produced by task A (201) that is needed for execution of task B (202) and Task C (203).

In the same way task C (203) must be executed before task D (204) and task E (205) can be initiated. Task C (203) produces output (210) which is required for execution of task D (204) and task E (205).

Also, task B (202) must be executed before task F (206) can be executed. Task B (202) produces output (212) that is needed for execution of task F (206). Note that task E (205), task F (206) and task H (208) must be completed prior to execution of task G (207). Task G (207) requires item (213) from task E (205), item (215) from task F (206) and item (216) from task H (208) before execution of task G (207) can be initiated. Task G (207) produces output (217).

As explained further below the individual tasks illustrated in FIG. 2 may represent a variety of distributed activities including computational or computer executions, transportation of goods or people, manufacturing of selected products or items, office work, or, in general, any one of many interrelated tasks wherein the execution of one task depends upon the completion of prior tasks in specified relationships.

The individual tasks depicted in FIG. 2 require particular equipment and/or personnel for their execution as indicated in FIG. 1. That equipment and/or personnel are referred to herein as task execution agents. Example task execution agents (301) are further listed in FIG. 3 and may include, for example, computers, storage units, transportation equipment, manufacturing equipment, factories, personnel and/or communications equipment. The particular equipment required for an individual task will, of course, depend on the nature of the specified task.

Importantly, in accord with certain aspects of this invention, the task execution agent attributes may dynamically vary with time which variations must be taken into account when assigning such task execution agents to execute particular tasks of the type indicated in FIG. 2. Example execution agent attributes (302) are shown in FIG. 3 and may include for example the execution agent capability, capacity, speed, availability, utilization, location, cost or the quantity or amount of a particular agents availability to execute particular tasks. For example, if a particular task execution agent exists but is not available or is perhaps over utilized requiring long waits for access to that agent, such circumstances may be reflected in the directed activity decision mechanisms to ensure timely and efficient execution of individual tasks of the type indicated in FIG. 2. Likewise, in certain instances the location of the task execution agents may vary from time to time and that variation may likewise be reflected in the directed activity decision mechanism.

For these reasons, in accordance with this invention, task execution controllers are utilized wherein those controllers have access to the dynamically varying execution agent attributes. Such task execution controllers (303) identified in FIG. 3 may include for example computers, analog or digital controllers, personnel, communication devices, timers, sensors and the like. These controllers are explained more fully below but include the ability to record dynamically time varying execution agent attributes. These dynamically varying execution agent attributes are communicated from the task execution controllers to directed activity controllers to enable efficient execution of the entire directed activity and efficient utilization of the various equipment used to execute the tasks of that activity.

Examples of possible directed activity controllers (304) are also listed in FIG. 3 and include for example computers, electronic controllers, special computer software, and operating personnel.

The task execution controllers (303) are connected to task execution agents (301) and directed activity controllers (304) via communication network equipment (305). Communication equipment examples (305) are listed in FIG. 3 and may include radio equipment and networks, fiber-optic networks, the Internet, the World Wide Web, switching systems and wireless communication devices including cellular telephones, tablets, laptop computers, and special purpose controllers with communication capabilities.

The directed activity control system of this invention also allows optimization of overall network execution using various mathematical optimization tools. Examples of such optimization tools (306) are also listed in FIG. 3 and include, without limitation, expert systems, graph theory, fuzzy logic, matrix theory, probability theory and statistics. The particular optimization tool or combination of tools to be used in a given application will depend upon structure and the occurrence of events in the directed activity control program.

Figure 4:
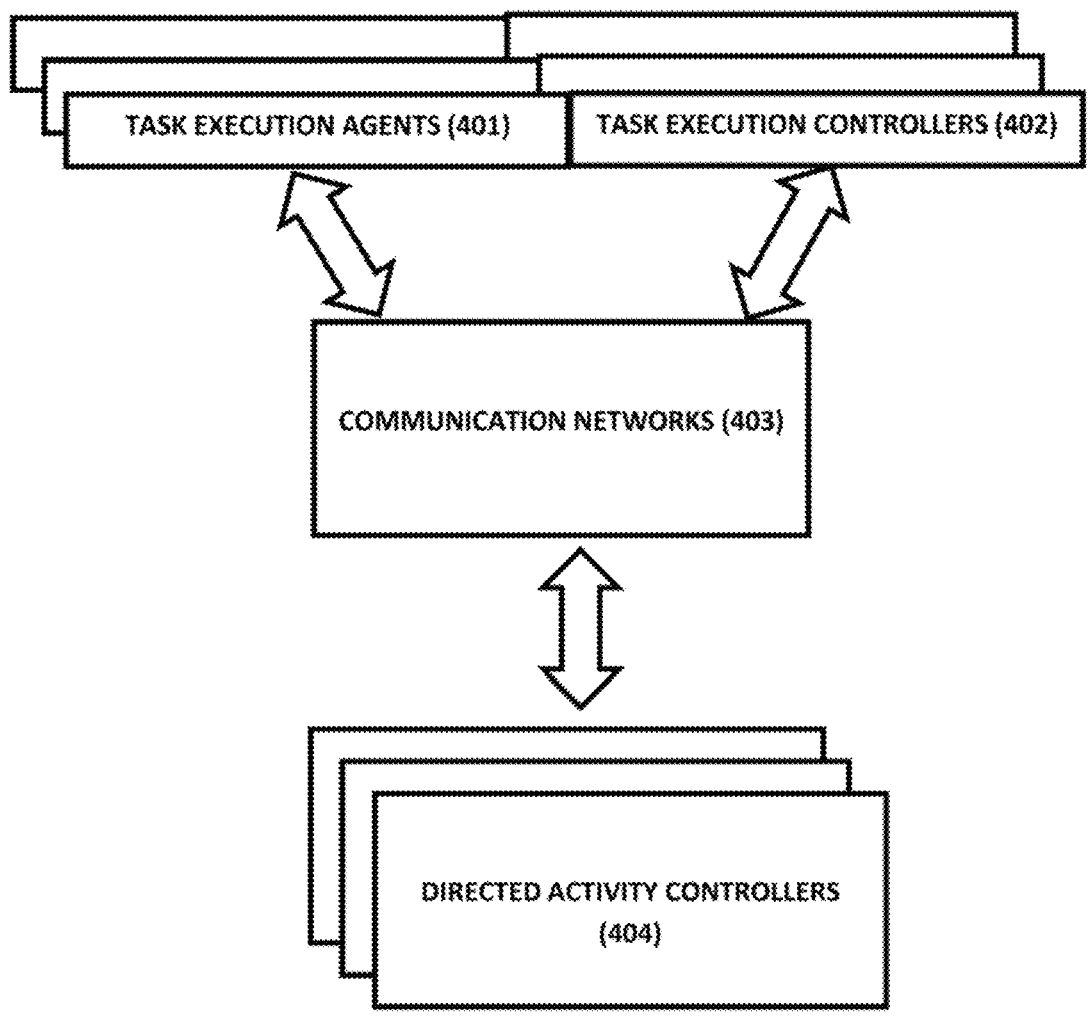
FIG. 4 illustrates, without limitation, communications between task execution agents, task execution controllers and dynamic directed activity controllers through the communication networks used in the overall directed activity control system.

FIG. 4 illustrates in graphic form communication relationships between the above-described network elements. As illustrated in FIG. 4, each task execution agent (401) may have an associated task execution controller (402). It is to be appreciated that the task execution agents (401) and task execution controllers (402) correspond to the task execution agent and task execution controller examples disclosed in FIG. 3. The task execution controllers (402) communicate with the directed activity controllers (404) through communication networks (403). The task execution controllers (402) transmit status and control information to the directed activity controllers (404). That information includes status of the task execution agents (401) and information concerning any outputs produced by the execution of these agents including attributes of those outputs and their location necessary for execution of subsequent tasks in the overall directed activity network.

Figure 5:
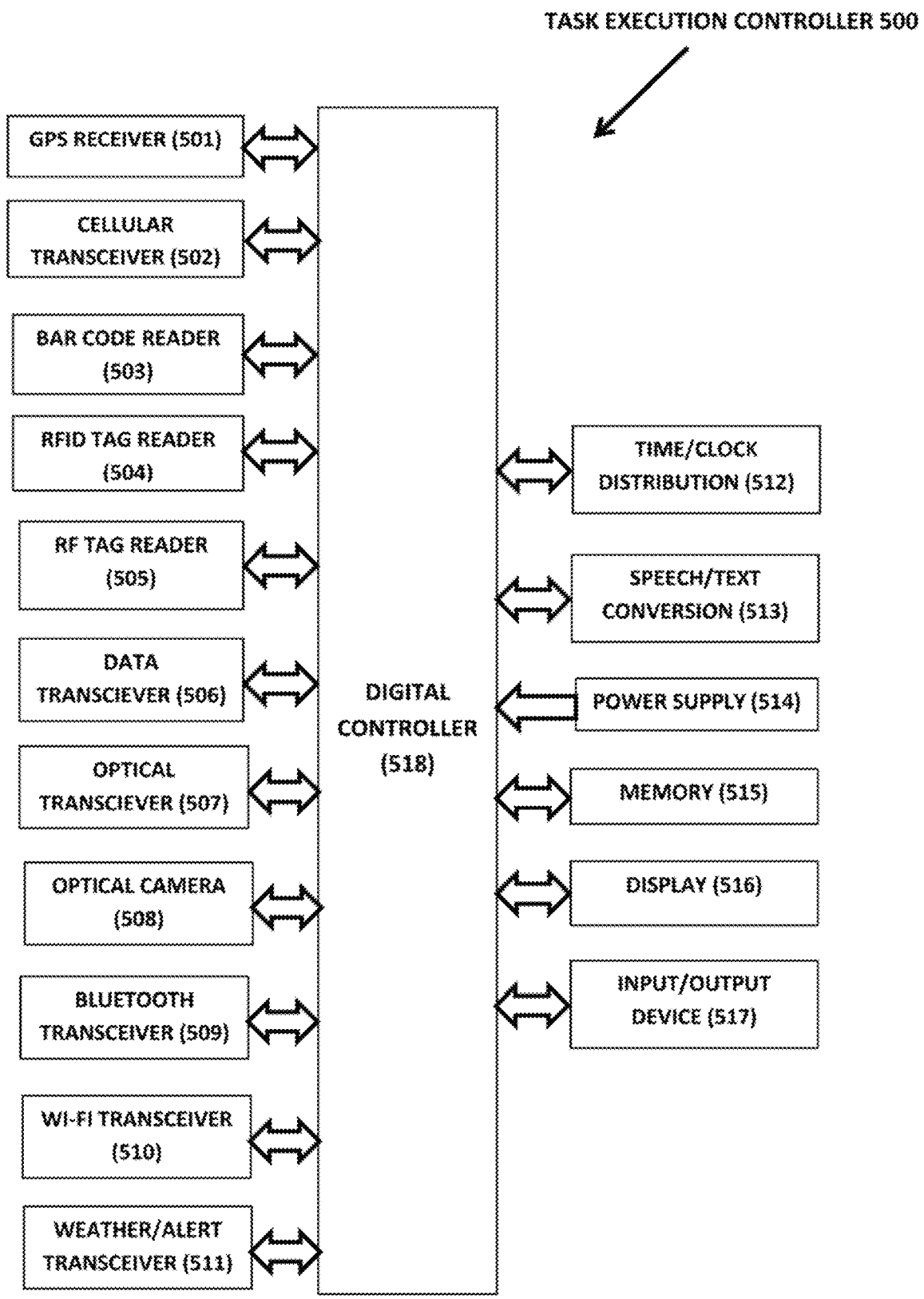
FIG. 5 illustrates, without limitation, an exemplary task execution controller with multiple sensor and communication inputs for initiation, execution, communication and control of a particular task execution agent.

FIG. 5 provides a block diagram of a task execution controller (500). It is to be appreciated that, throughout the following discussion, the task execution controller (500) corresponds to the task execution controllers (402) disclosed in FIG. 4. The task execution controller (500) comprises the digital controller (518) with the various exemplary communications, control, input-output and other capabilities (501-517) indicated in the figure. In some instances some of these various capabilities may be integrated directly into the digital controller 518 rather than being implemented as separate equipment. The task execution digital controller 518 may be, for example, a microprocessor or other appropriate digital circuitry well known to those skilled in the art of digital control.

Recent years have seen revolutionary progress in communication devices, computers, and automation technology. The Internet and World Wide Web make communication between computers effortless. Ubiquitous voice and data cellular telephone devices, operating over the expanding worldwide telecommunications network present multiple new opportunities for communications and improved efficiencies in human activities. And computers themselves have processing and storage capabilities that seemed impossible only a few years ago. Distributed computing and storage is becoming commonplace, including "cloud computing" with shared remote storage of data and shared access to distributed data bases. The task execution controller of FIG. 5 includes the capabilities to operate in this environment.

For example, the task execution controller of FIG. 5 makes use of revolutionary changes that have been developed in telephony and data communication networks. Those changes include almost universal adoption of fiber optic backbone transmission facilities using wave division multiplexing (WDM) with optical switching and multiplexing complimenting, and in some cases replacing, conventional electronic equipment. Gigabit data rates are possible over these networks. Migration from hierarchical telephone networks of the past to ring networks and more recently to optical mesh and hybrid mesh/ring networks with distributed control has dramatically increased network capacity and flexibility.

The task execution controller (500) also includes various possible external interfaces and sensors to monitor the status of the task execution agents of FIGS. 3 and 4. For example the exemplary implementation of FIG. 5 includes a GPS receiver (501) and its associated antenna with required interface circuitry. The Global Position System (GPS) provides immediate location data for mobile and fixed location entities. Massive databases exist providing GPS coordinates for virtually every addressable location in the United States and elsewhere. Mobile communication networks implement Home Location Registries (HLRs) and Visitor Location Registries (VLRs) providing instant location information on mobile wireless devices through the country.

The GPS receiver (501) monitors the signals received from geostationary, earth orbiting satellites and provides accurate location information for the receiver. In one embodiment of this invention, the location of the task execution controller (500) and associated GPS receiver (501) coincides with the physical location of the associated task execution agent. For example, certain of the task execution agent examples (301) of FIG. 3 may in fact be portable or subject to relocation. Computers and storage units are portable today. Many such units are handheld or may easily be moved from location to location by persons owning or operating that equipment.

Location information can also be derived based on cell phone tower proximity and triangulation methods. Proximity of Wi-Fi transceiver units may also be used to determine location information.

Also, transportation equipment execution agents clearly may move from one location to another requiring new coordinates that vary with time. Likewise manufacturing equipment may be moved from one location to another. Personnel required in the execution of particular tasks clearly may move from time to time. All of these uncertainties and location of the task execution agents and changing of those locations over time requires dynamic updating of the directed activity control databases to accurately reflect the location of such agents. One aspect of this invention provides dynamic update of the task execution agents via communication between the associated task execution controller (402) and the appropriate directed activity controller (404) of FIG. 4.

Also illustrated in FIG. 5 is a connection between a cellular transceiver (502) and the task execution controller (500). Cellular transceivers, or cell phones, including for example, products such as Apple's iPhones and Samsung's Galaxy smart phones include many integrated capabilities useful in implementing the task execution controllers (500) of this invention. Indeed, in some instances, such cellular transceivers may themselves include sufficient capability to implement a required task execution controller. Cellular transceivers include not only the capability for voice communication, but also include sophisticated data communication capabilities, GPS receivers, cellular network cell location information, photographic and video camera technology, and user-defined applications that may be selected to perform a wide variety of computational and/or communication functions. All of these capabilities and others found in cellular transceivers and cell phones may be useful in the implementation of task execution controller requirements for particular directed activity control as set forth in this invention.

A particular capability implemented in cellular transceivers or cell phones is that of multiple data communication capabilities. Such cellular transceiver devices are designed to communicate over multiple communication networks including cellular telephone networks based on GSM and/or CDMA technology. GSM systems make use of orthogonal frequency division multiplexing (OFDM) for signal transmission. OFDM provides important advantages in multipath environments wherein interfering signals may arrive at a receiver from multiple directions based on signal reflections from intervening structures in the transmission path. Communication requirements for the directed activity control system of this invention may frequently include operation in such multipath environments. Examples would include communication within buildings with intervening interior and exterior structure and communication in metropolitan areas with multiple large buildings and structures that may give rise to interfering signal reflections.

OFDM technology includes miniaturization of receivers and transmitters using integrated circuit technology, digital implementation, and direct conversion receiver structures. These implementations avoid costly intermediate frequency down conversion and filter implementations that may require external components and prohibitive space for miniature implementation. In a similar but different way, CDMA systems combat the presence of multiple interfering signals using code division multiplexing techniques that permit identification and separation of individual received signals in the presence of such interference.

In addition to GSM and CDMA technology, cellular transceivers also provide Bluetooth communications for short range applications. Bluetooth transceivers may also be implemented separately from cellular telephone as shown in transceiver (509) of FIG. 5. In many instances to be found in applications of the dynamic directed activity control system and method of this invention, such short range communication capabilities are well-suited for control signals between task execution agents (401) and task execution controllers (402). Bluetooth makes use of frequency division multiplexing with coded frequency hopping between selected Bluetooth frequencies to improve security of the connection and help to mitigate the effects of multipath transmission. Bluetooth receivers are implemented with direct conversion of the RF signal to a low IF or directly to baseband to simplify receiver architecture. Such implementations have been made possible with advances in MOS integrated circuit technology designs and permit miniaturization of Bluetooth receivers. These advances make Bluetooth particularly attractive for communications between task execution controllers and direct connectivity controllers of this invention.

Another option for communications between the task execution controller and task execution agents of this invention includes the use of Wi-Fi transceivers (510) as also illustrated in FIG. 5. Advances have been made in radio technology, including implementation of complete Wi-Fi radio receivers and transceivers on single CMOS integrated circuits. Using CMOS RF interfaces and DSP technology has enabled single down conversion receivers that avoid costly and difficult to implement intermediate IF structures, making implementation of complete radios on single chips of silicon feasible. These advances have made possible many new products including Bluetooth devices, Wi-Fi data networks, CDMA and GSM/EDGE cell phones, LTE and miniature FM/AM radios and compact TV receiver ICs.

Wi-Fi transceivers make use of OFDM signaling which provides improved performance in the presence of multipath in a manner similar to that achieved in the above-described GSM cell phone systems. Wi-Fi systems have the advantage of being implemented on a local basis with separate base stations not requiring direct interconnection with a wireless cellular communication network. Wi-Fi networks provide short range communication in such situations and are ideally suited for many of the communication requirements of the dynamic directed activity control system of this invention.

FIG. 5 also illustrates the possible use of separate data transceivers (506) for data communication between the directed activity execution agents in the directed activity controllers of this invention. Such data transceivers may employ a variety of signaling and modulation formats including frequency modulation (FM), frequency shift keying (FSK), amplitude modulation (AM), phase modulation, and variations of these methods using for example multi-level signaling to increase the number of data bits transmitted per symbol time.

An important capability of cellular and data transmission networks for data communications is the use of short message service (SMS). SMS is based on the use of telecommunication network control channels for transmission of short messages by users of those networks. Voice and data telecommunication networks extend network control channels that were once restricted to network operations to customer usage including Short Message Service (SMS) channels.

SMS permits the transmission of unsolicited short messages that may be sent to destination transceivers without first contacting that transceiver to set up a pre-connected logical or physical communication path for communication of the desired message. Such SMS messages are described as being "pushed" by the sender as opposed to being "pulled" by the intended recipient. In this way "pushed" transmissions are more efficient in terms of communication network resource requirements and are well-suited for the communication requirements of the dynamic directed activity control system and method of this invention.

Bar coding, RFID tagging and toll tag technology provide heretofore unavailable location data for virtually any item. Connection of barcode reader (503) to the task execution controller (500) is illustrated in FIG. 5. The barcode reader (503) may be used to identify particular items or materials required or produced by the various task execution agents (401) as identified in FIGS. 1-4. For example, standard items of commerce including, for example, manufactured goods and products may be identified by barcoding. Barcodes may also be used to identify various task execution agents including computers, storage units, manufacturing equipment, communications equipment and other equipment used as task execution agents. Barcoding of such items is particularly useful in the dynamic activity control system of this invention because of its ubiquitous use in society for identifying and tracking many items of commerce. Barcoding may be used to report the location of such items including, for example, items in transit via shipping arrangements and the location of such items in storage facilities such as used in warehousing applications. Barcoding is also used, of course, for point of sale item identification, pricing, stock replenishment and related commercial material handling applications.

As also illustrated in FIG. 5, radio frequency identification (RFID) tag readers (504) may be interconnected and used with the task execution controller (500) of this invention. RFID tags make use of radio signal transmission between individual tags and tag readers for identification of items as discussed above. RFID tags are frequently based on the use of near-field communications with close proximity between the individual tag and the tag reader. Indeed, RFID tags frequently derive power required for their operation and signal transmission from electromagnetic fields emanating from the separate tag reader. Such capability enables the implementation of miniature, low-power, inexpensive tags that may be used to identify individual items using RF signaling. Here again, these unique capabilities make RFID tags and RFID tag readers particularly useful in many applications of the present dynamic activity control system invention.

Yet another application of RF tag reading is illustrated in FIG. 5 with the interconnection of RF tag reader (505) with the task execution controller (500). As in the case of the RFID tags discussed above, the RF tags read by RF tag reader (505) may be powered from electromagnetic waves propagated from the reader to individual RF tags. Here again such implementations permit simplification of the RF tags with advantageous miniature implementation. Example applications of RF tag reader (505) include identification of transportation vehicles such as, automobiles, trucks and trains. Such RF tag readers are common today and include, for example, toll tag readers for identification of vehicles at the entry, intermediate stations and exits of toll ways for the purpose of billing customers for driving on such toll ways. With proper reporting such toll tag readers may also transmit to central controllers such as the dynamic direct connectivity controller of this invention the exact location of associated vehicles. In addition to the location of such vehicles, such information may be used to compute transit times between separately located toll tag readers and, in-turn, form a basis for calculation of the speed of such vehicles and traffic congestion being encountered by those vehicles.

Yet another technology for use in the present dynamic, distributed directed activity control system and method is that of optical camera systems such as optical camera (508) of FIG. 5. Full-motion video and still-image camera technology has developed into microminiaturize cameras and displays. This technology has also been integrated into the handheld communication devices with instant access to world-wide high speed networks for immediate image and video images now a reality.

Miniature full motion and still video cameras are available today and are incorporated in computers, tablets and cellular telephones and in stand-alone configurations. In addition to the capability to capture images of selected objects or scenes, in cellular telephones such camera systems are integrated with image processing, storage and transmission capabilities of the cellular telephone. These integrated capabilities permit the transmission of captured images to remote destinations for viewing or further analysis or image processing. In the present dynamic, distributed directed activity control system invention such images may be used for tracking manufactured goods, items of commerce and/or products produced in the present invention. Image analysis may be useful in determining critical aspects of captured scenes including, for example, disaster or problem occurrence information at particular locations critical to the overall directed activity control system. For example, the occurrence of fires, congestion, natural disasters, violence or other such unanticipated events that may affect the overall dispatching of task assignments and items necessary for those tasks can be transmitted in image form to appropriate controller locations. Automated image analysis and recognition using digital processors may be used. In addition, image analysis by appropriate personnel assigned to monitor and assist in overall dispatching operations of the present invention may be appropriate in some instances.

FIG. 5 also shows a weather/alert transceiver (511) connected to the task execution controller (500). For example, the weather/alert transceiver (511) may be used in the directed activity control system and method of this invention to alert the directed activity controller of weather forecasts or occurrences that will impact dispatching of tasks, execution of tasks, delays in operation or other adverse consequences of weather phenomenon. For example, NOAA Weather Radio All Hazards (NWR) is a nationwide network of radio stations broadcasting continuous weather information directly from the nearest National Weather Service office. NWR broadcasts official Weather Service warnings, watches, forecasts and other hazard information 24 hours a day, 7 days a week. Known as the "Voice of NOAA's National Weather Service," NWR is provided as a public service by the National Oceanic and Atmospheric Administration (NOAA), part of the Department of Commerce. NWR includes 1000 transmitters, covering all 50 states, adjacent coastal waters, Puerto Rico, the U.S. Virgin Islands, and the U.S. Pacific Territories. NWR requires a special radio receiver or scanner capable of picking up the signal. Broadcasts are found in the VHF public service band.

Additionally, third party sources deliver email and SMS weather alerts directly to the public. Among these, for example, AccuWeather.com provides free email forecast and severe weather alerts. Also, ALERT FM is an aggregator of State and Local emergency information with multiple contact paths for mass notification. Emergency information is delivered via the data subcarrier of existing FM radio stations, SMS (text) and email. This personal alert and messaging system allows emergency management officials to create and send digital alerts and messages to recipients such as first responders, school officials, businesses, and citizens based on geographic or organizational groupings. Such alerts and messages might include NOAA weather warnings, evacuation instructions, homeland security notices, Amber Alerts, or school closings. Such emergency alert signals may be important to the dynamic directed activity control system of this invention.

Also, a time/clock distribution unit (512) connected to the task execution controller (500) of FIG. 5 may be used to distribute accurate clock information throughout the dynamic directed activity control system of this invention. Today time signals are broadcast using AM, FM, shortwave radio, Internet Network Time Protocol servers as well as atomic clocks in satellite navigation systems. For example, WWV is the call sign of the United States National Institute of Standards and Technology's (NIST) HF ("shortwave") radio station in Fort Collins, Colorado WWV continuously transmits official U.S. Government frequency and time signals on 2.5, 5, 10, 15 and 20 MHz. These carrier frequencies and time signals are controlled by local atomic clocks traceable to NIST's primary standard in Boulder, Colorado by GPS. These and other available time transfer methods may be used in the dynamic directed activity control system and method of this invention.

Referring again to FIG. 5, time/clock distribution unit (512) may update clocks within the task execution agents during normal operations. Power outages or equipment malfunctions may result in inaccurate timing in various elements of the dynamic directed task execution system and method described herein. Proper operation of the system and method may depend upon coordinated operation of the various network elements based on a common and known time basis. To ensure time/clock accuracy throughout the network of elements used in the dynamic directed activity control system, accurate broadcast timing signals may be used to update the time/clock distribution unit (512) of FIG. 5 or, alternatively, such broadcast timing signals may be received by the directed activity controller which in turn broadcasts timing update signals to the task execution agents of FIGS. 4 and 5.

Also integrated with the task execution controller (500) of FIG. 5 is speech/text conversion unit (513). Powerful speech to text conversion software is available today and may be used as part of an audible speech command system in the dynamic, distributed activity control system and method of this invention. Such audible speech commands may be used, for example, to direct system activities, report on progress, update execution agent attributes (402) in accordance with changing situations and generally enhance overall operation by enabling spoken directives to be used for system control and reporting.

The task execution controller (500) makes use of power supply (514) which may comprise batteries, alternating current conversion with appropriate transformers, or alternative energy sources including energy derived from solar cells or other natural green energy power sources.

Memory (515) provides storage for task execution controller (500) software and data and may comprise random access memory (RAM), read only memory (ROM), optical storage, disk storage units or other memory means known to those of ordinary skill in the art.

A display (516) may be integrated into the task execution controller (500) or be a separate display unit to facilitate overall system operation. Display options include LCD, LED, plasma displays, smart glass and displays with touchscreen control.

Input/output device (517) may be used for external access to the task execution controller (500). For example, standard USB ports may be used for such access. Other possibilities include the Common Flash memory Interface (CFI) approved by JEDEC and other standard memory unit interfaces.

Figure 6:
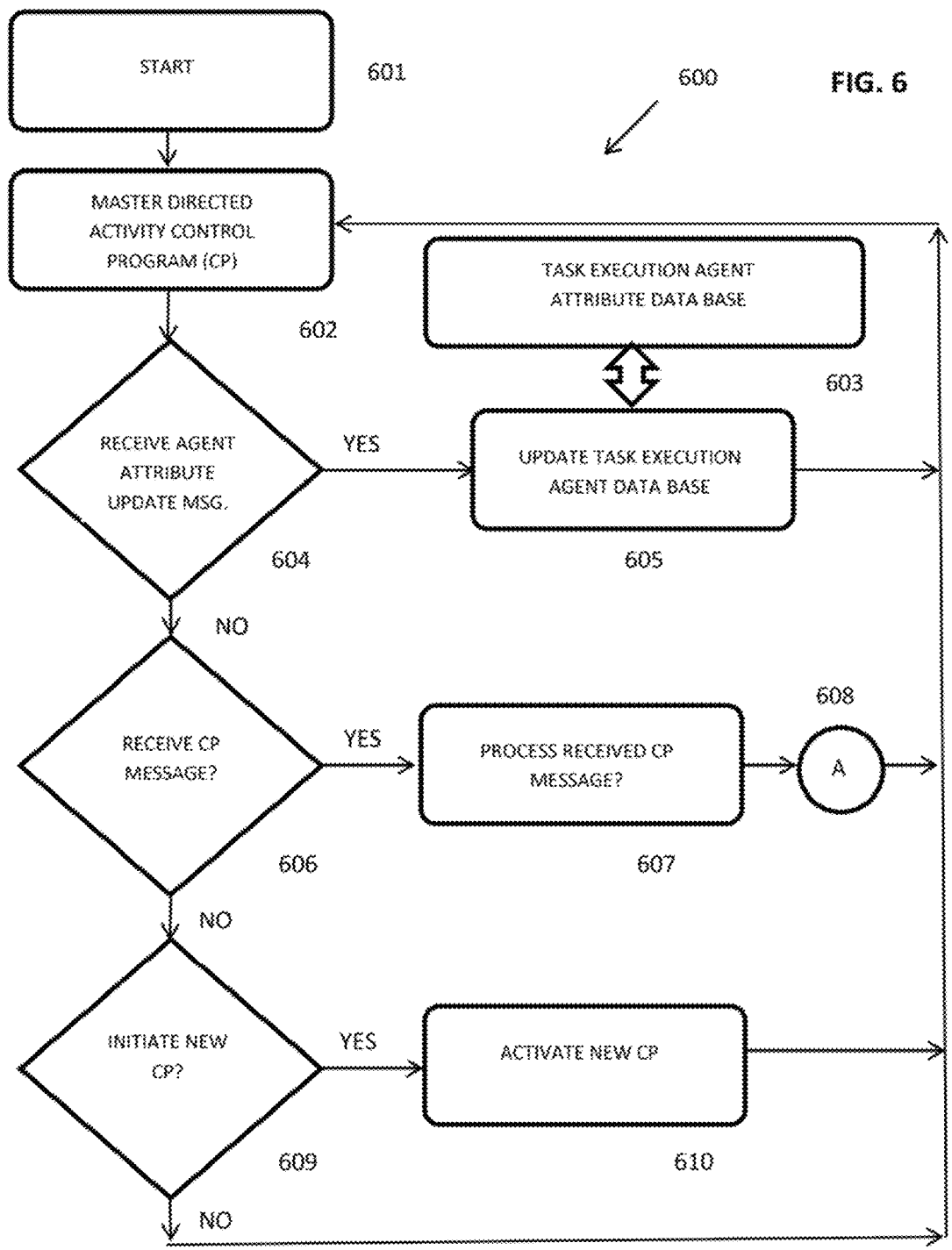
FIG. 6 illustrates, without limitation, a top-level flowchart for operation of a dynamic directed activity controller.

FIG. 6 is a top level flow diagram for a control program (600) for execution by the dynamic, distributed directed activity control system and method computers of this invention. It should be noted that multiple different control programs (600) may be executed simultaneously by the dynamic, distributed directed activity control system and method of this invention. The control program (600) may be initiated automatically or by operator action at the start block (601). Initiation begins the master dynamic directed activity control program (CP) (602). For example, the directed activity control program (602) executes the exemplary directed activity control network of FIG. 2 comprising individual tasks A through H with task precedence relationships indicated by arrows interconnecting the tasks and various outputs from the individual tasks indicated and the required use of those outputs in subsequent tasks in the entire dynamic, distributed directed activity network as described above.

Once initiated, the master directed activity control program (CP) (602) monitors internal message queues for receipt of control program (CP) messages from task execution agents as described above in FIGS. 1 to 5 and the associated text. The messages from the task execution agents provide information to the directed activity control program concerning the completion of previously assigned tasks, the location of task outputs and/or current status of the associated task execution controller attributes as described in FIG. 3 above. These task execution agent update messages provide for dynamic update of task execution controller attributes as those attributes may change over time. As indicated in FIG. 3 above, exemplary attributes may include, for example, updates on current task execution agent capability, capacity, speed, availability, utilization, location and/or quantity of such execution agents available at the current time.

In the control program (600), a test is made at decision element (604) to determine whether or not any new agent attribute update messages have been received. Such messages may be accumulated in a queue, not shown, which may be interrogated for new messages. If a new agent attribute update message has been received, the control program (600) updates the task execution database (603) at block (605) of FIG. 6. Upon completion of the updating of the task execution agent attributes database, control returned to the master directed activity control program (602).

When all agent attribute update messages have been processed, control is passed to decision element (606) which tests for receipt of any control program messages. If a control program message has been received at decision element (606) of the dynamic directed activity control program (600), that message is processed at block (607) as indicated and more completely described in FIGS. 7 and 8 via connector "A" (608) in FIG. 6. After processing of the received message, control is returned to the master directed activity control program (602) as indicated in FIG. 6.

If no control program message is detected at decision element (606) the directed activity control program proceeds to decision element (609). At (609) the directed activity control program tests whether or not a new control program is to be initiated. Such initiation may be triggered, for example, by recognition of control programs in a control program queue or table, based on control program priority or at a specified time. If it is determined that a new control program is to be initiated at decision element (609), then that control program is initiated at (601). Multiple directed activity control programs may be simultaneously executed once initiated by the directed activity control processor or by multiple such processors. If no new control program is to be initiated at decision block (609), control is returned to the master directed activity control program (602) as indicated in FIG. 6.

Figure 7:
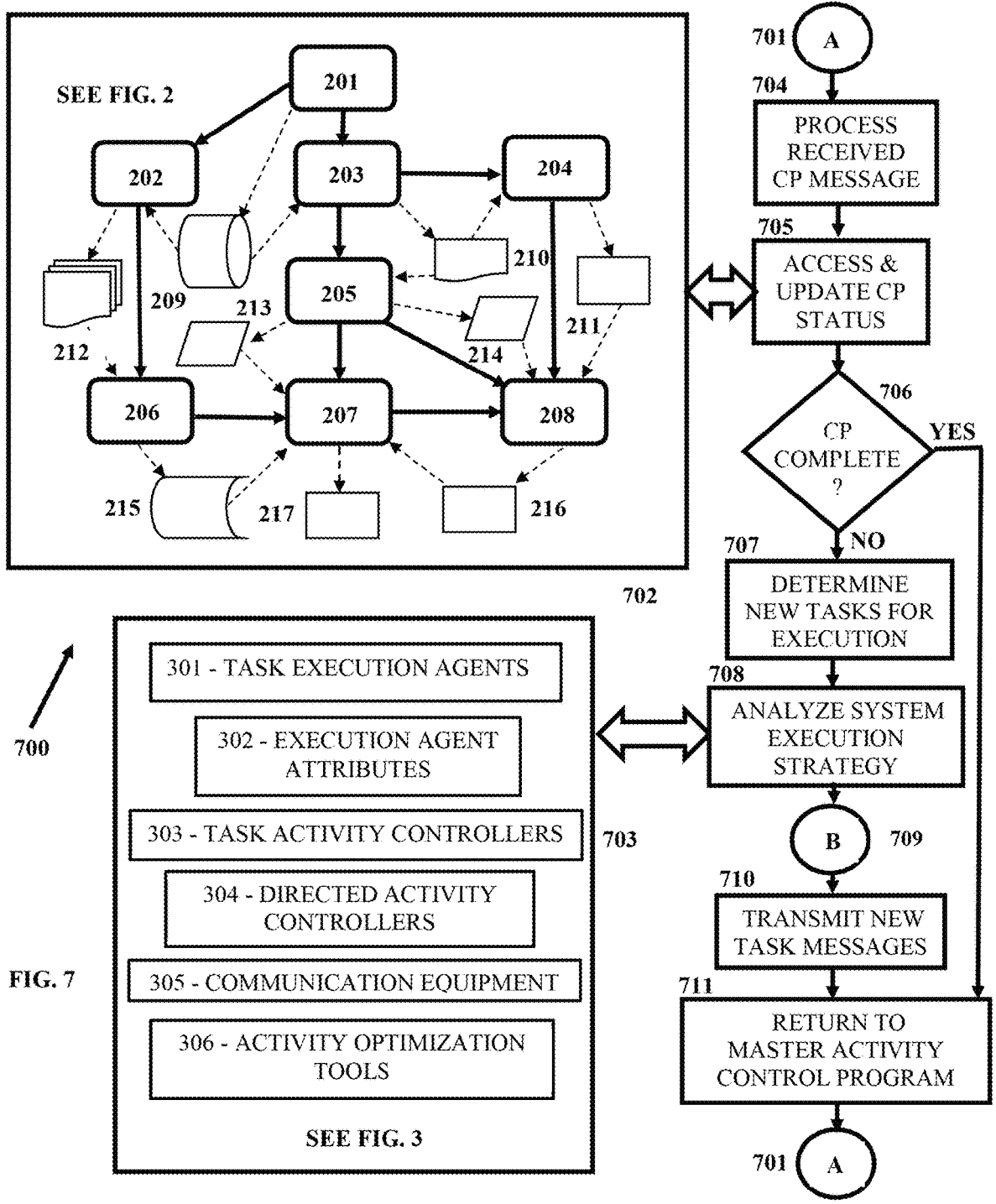
FIG. 7 depicts, without limitation, operations involved in the processing of received control program messages by a dynamic directed activity controller from a task execution agent.

FIG. 7 is a flowchart (700) for processing of a received control program message via connector "A" (608) of FIG. 6 with control being passed to the corresponding connector "A" (701) of FIG. 7. Processing of the received control program message begins at block (704) of FIG. 7 with message recognition and parsing of control fields contained within that message. At access and update control program block (705), the master dynamic directed activity control program depicted as exemplary control program (702) corresponding, for example, to the control program of FIG. 2 is updated based on the contents of the received message. Such updating may comprise indication in the control program database of completion of particular activities, description of material or program data files produced by a completed task, and/or updating of dynamically changing status of task execution agent attributes as discussed above.

Once the control program database is updated at block (702), a test is made for control program completion at decision element (706). If the dynamic directed activity control program is complete, control is passed to block (711) for return to the master activity control program via connector "A" via connector (701).

Returning now to decision element (706), if the control program itself has not been completed control is passed to block (707) to determine the identity of new tasks identified within the control program and ready for execution. New tasks will be available for execution when the precedent requirements of the directed activity control program have been met and the necessary outputs from preceding tasks that are required to execute the subsequent task are identified and available. Once one or more tasks are so identified control is passed to block (708) to analyze the control program and overall system status for determination of an execution strategy to be employed for initiation of those tasks. Such analysis is based on the totality of system parameters as indicated in the exemplary tables (301) to (306) of FIG. 3 of this patent. Control is passed via connector "B" (709) to the message analysis operations of FIG. 8.

Upon completion of the above analysis and determination of the proper execution strategy, control is returned via connector "B" (709) to block (710) for transmission of new control messages to selected task execution agents with sufficient information for those agents to locate necessary inputs and execute the associated tasks. Having transmitted those messages, control is returned to the master activity control program of FIG. 6 via block (711) and connector "A" (701).

Figure 8:
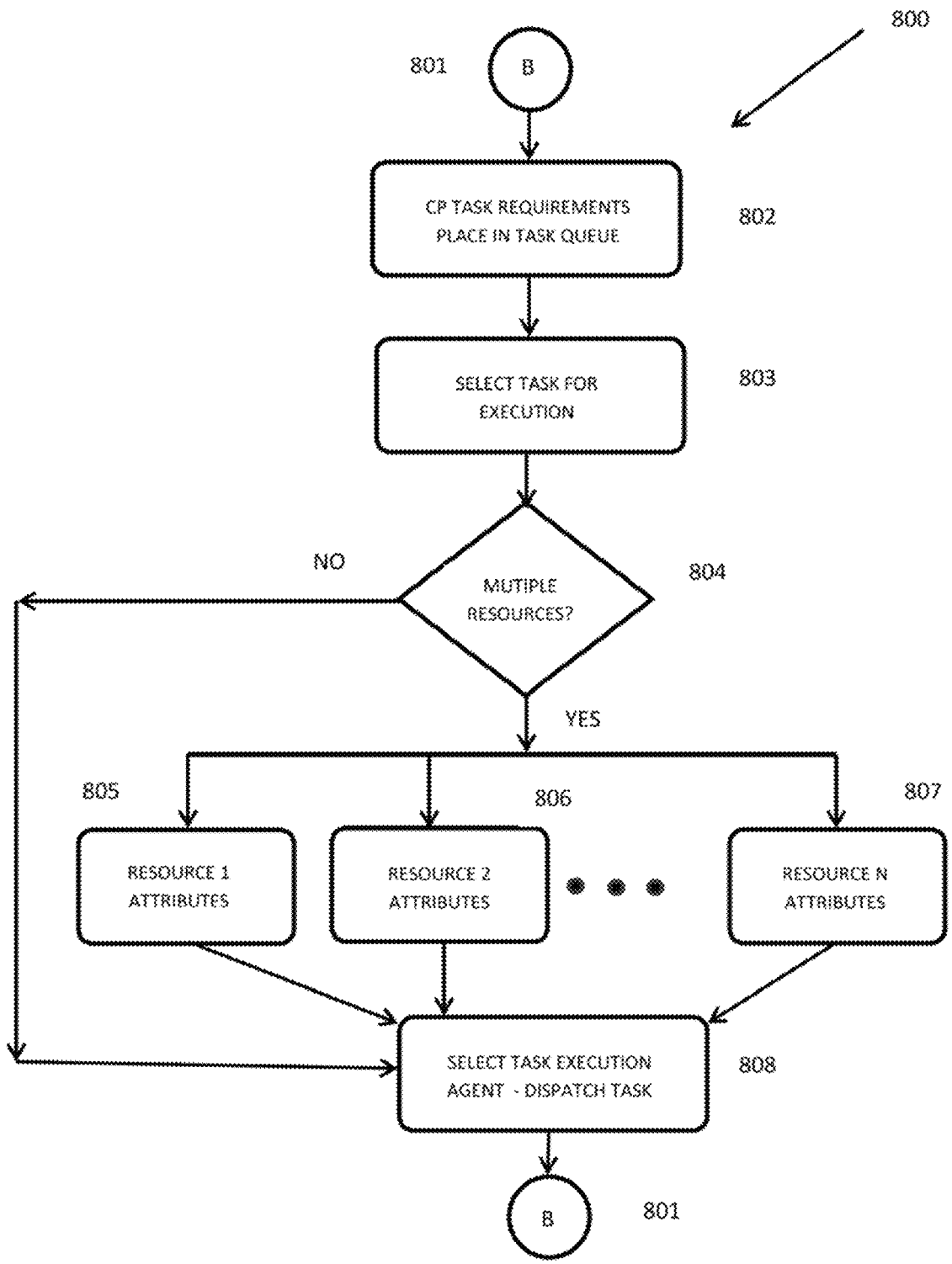
FIG. 8 depicts, without limitation, a flowchart for carrying out the task execution agent assignment for particular dynamic directed activity tasks.

FIG. 8 is a flowchart (800) indicating exemplary operations in the analysis to determine the execution strategy of FIG. 7. Control is passed from connector "B" (709) via connector "B" (801) in the flowchart of FIG. 8. As indicated in FIG. 8, task requirements corresponding to the received message are evaluated at block (802). Those requirements will include an indication of the type of required task execution agent (301) such as computers, storage units, transportation equipment, manufacturing equipment, factories, personnel and/or communication equipment as indicated in FIG. 3.

At block (803) the class of appropriate task execution agents is identified based on the analysis of the task requirements in block (802). For example, that class might be transportation equipment or manufacturing equipment. Having identified the class required for the task execution agent, the next determination to be made is a selection of a particular task execution agent based on the task requirements and the task execution agent capabilities. At block (803) the task requirements of the task execution agent attributes are compared so that a proper determination of a task execution agent to be assigned to the particular task can be made. At (804) a test is made to determine if any one of multiple alternative resources may be used to execute the required task. If only one resource is suitable for the task, control is passed to block (808) with the task execution agent selected and the task dispatched for execution. At that point control is returned via connector B (801) to the flow of FIG. 7 at connector "B" (709). If at decision element (804) it is determined that anyone of multiple resources may be used to execute the task, the attributes of those potential resources are evaluated at blocks (805), (806), and (807) to determine the most appropriate resource to be used to execute the particular task. This determination may involve several considerations including, for example, comparison of the task requirements with the required task execution agent attributes (302) such as capability, capacity, speed, availability, utilization, location, cost and/or quantity of such agents as indicated in FIG. 3.

At block (808) of FIG. 8 a particular task execution agent is selected based on the above described comparisons and analysis to execute the particular task of the overall dynamic, distributed directed activity network system and method of this invention. Control is then returned via connector "B" (801) of FIG. 8 to the flow of FIG. 7 and corresponding connector "B" (709).

The above-described analysis to determine the execution strategy may in some instances rely on various available mathematical optimization tools known to those of ordinary skill in the art. Examples of such optimization tools (306) are indicated in FIG. 3 and may include expert systems, graph theory, matrix theory, artificial intelligence, statistics and/or probability theory.

FIG. 9 illustrates a typical, exemplary task execution message format (900) for a message communicated between a task execution agent and the directed activity controller in the dynamic directed activity control system. Such messages are exchanged between the task execution agents and the directed activity controllers of FIGS. 1 and 3. Exemplary execution agent attributes (302) identified in FIG. 3 may be included in the message (900) of FIG. 9.

FIG. 10 illustrates an exemplary, partial database (1000) at the task execution controller compiling dynamically changing information received from the task execution agents concerning capabilities of the various agents throughout the directed activity system. The exemplary agent attributes of FIG. 10 may be dynamically updated by the task execution messages (900) of FIG. 9. In this way a dynamic directed activity control system and method may track changes in task execution parameters with time to ensure better utilization and more efficient operation of the total dynamic directed activity control system and method execution and implementation.

Expert system technology may be used to select tasks for execution at block (803) of FIG. 8 and to select particular resources from among many potential resources to execute a particular task as illustrated, for example, at blocks (805), (806), and (807) of FIG. 8. As an example of such possibilities, FIG. 11 depicts an expert decision matrix for evaluating the suitability of any individual resource for the execution of a particular task in FIG. 8. In this particular example, two variables—time and cost—are used to assist in the evaluation of particular resource suitability. In the matrix (1100) of FIG. 11, the cost variable is defined in terms of five different ranges of cost comprising very low, low, medium, high, and very high. In a similar manner the time variable is defined in terms of five different ranges comprising very low, low, medium, high, and very high. The cost variable is intended to represent the cost of using a particular resource to execute the assigned task. For example certain transportation options may have varying costs and yet all be capable of performing the desired task. The time variable is intended to indicate the amount of time that is expected to be required to execute a particular task with the particular resource. For example, such time may vary depending upon the utilization of the resource, the speed of the resource, maintenance issues with the resource, or other time related variables determining the required time.

The expert systems matrix (1100) is used to derive a dispatch task index as shown in the figure. As indicated, the dispatch task index is defined in terms of ranges comprising very high, high, medium, low, and very low. In the example shown in FIG. 11, a medium cost and medium time results in a medium task dispatch index. As also indicated and medium cost and high time would result in a low task dispatch index. In other words, the appropriateness of a given resource for a given task decreases as the time to execute the task increases and as the cost to execute the task increases.

Expert system matrices (1100) may be constructed for each of the resources 1 through N of FIG. 8. Comparison of the values in these respective matrices may be used to assist in selecting the most appropriate resource to execute the pending task.

While the example of FIG. 11 is limited to two variables, cost and time, clearly additional tables may be constructed to include other important variables in the decision process.

The dispatch task index matrix (1100) of FIG. 11 is a form of artificial intelligence and forms the basis of an intelligent system. For example, each of the results indicated in FIG. 11 may be expressed in propositional logic form, for example, as follows:
1. If cost is medium and time is medium then dispatch task index is medium.
2. If cost is medium and time is high then dispatch task index is low.
3. If cost is very low and time is very low then dispatch task index is very high.

Clearly 25 such logical statements exist for the entries in FIG. 11.

The intelligent system matrix of FIG. 11 and its associated propositional logic expressions can also be used to formulate a fuzzy logic implementation of the controller for the directed activity control system of the present invention. Fuzzy logic has found expanded uses in the development of sophisticated control systems. With this technology complex requirements may be implemented in amazingly simple, easily managed and inexpensive controllers. It is a relatively simple method of representing analog processes on a digital computer. It has been successfully applied in a myriad of applications such as flight control systems, camera systems, antilock brakes systems, wash machines, elevator controllers, hot-water heaters, and stock trading programs.

Figure 12:
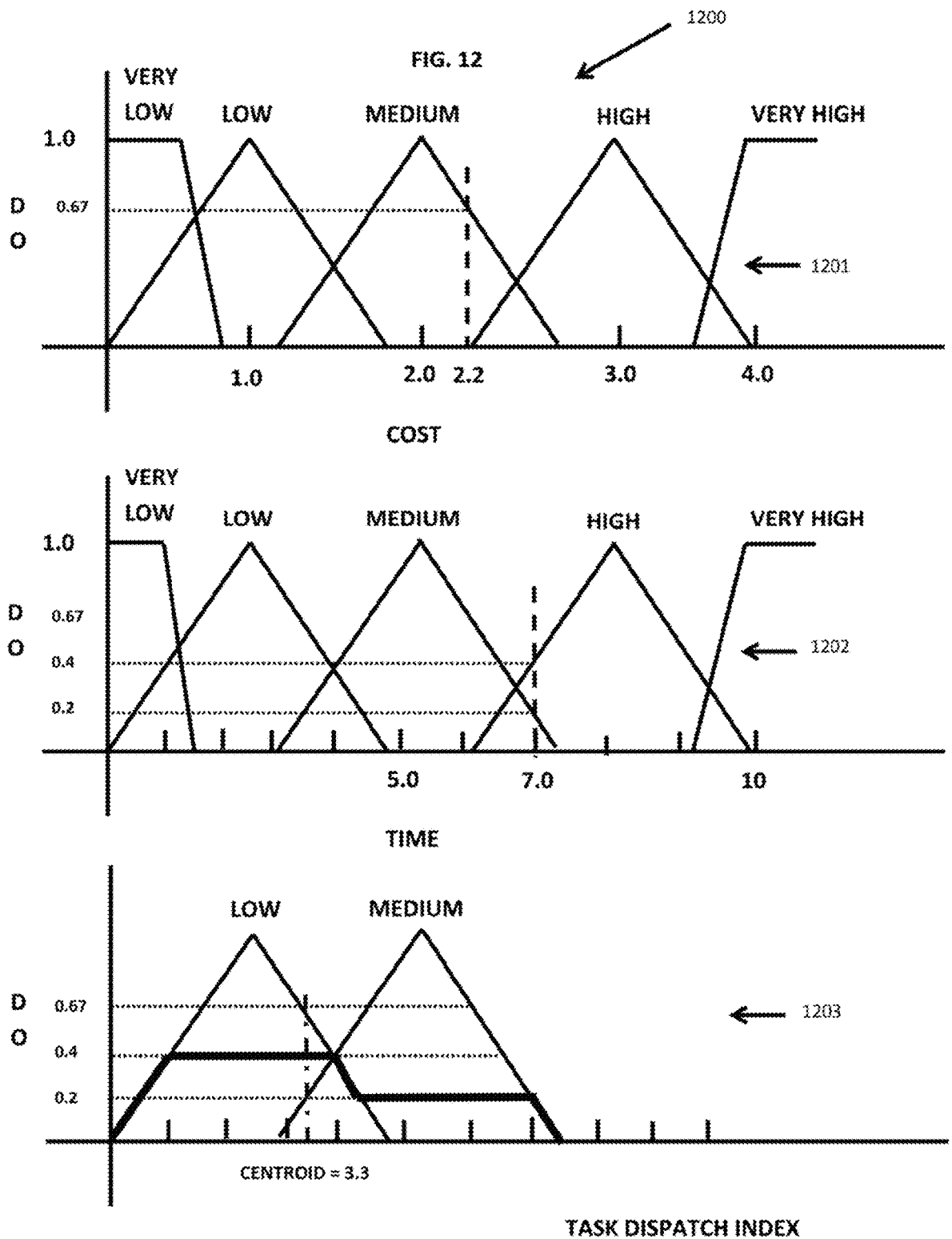
FIG. 12 illustrates, without limitation, exemplary fuzzy regions for a fuzzy logic implementation of the dynamic directed activity control system of this invention using control variables "cost" and "time" to derive the appropriate crisp value for the output solution variable "task dispatch index" with the degree of membership (DOM) for each of these.

In the present invention, the variable ranges for cost and time indicated in FIG. 11 may be "fuzzified," being expressed as fuzzy logic variables extending over the defined overlapping ranges as shown, for example, in FIG. 12. Fuzzy logic is a method of representing analog processes on a digital computer. With fuzzy logic control, statements are written in the form of the propositional logic statements as illustrated above. These statements represent somewhat imprecise ideas reflecting the states of the variables. Fuzzy logic is particularly appropriate when an expert is available to specify these propositional statements characterizing the relationships between system variables.

Fuzzy logic systems make use of "fuzzifers" that convert input variables into their fuzzy representations. "Defuzzifiers" convert the output of the fuzzy logic process into "crisp" numerical values that may be used in system control.

The graph (1201) of FIG. 12 illustrates such a possible "fuzzification" for the cost variable with overlapping ranges indicated in the figure. For example, as illustrated in the figure, a cost of 2.2 results in a degree of membership (DOM) of 0.67 in the cost membership class "medium." In this particular example, the cost of 2.2 does not result in membership in any other of the possible membership classes.

In a similar way in the graph (1202) of FIG. 12, "fuzzification" of the time variable is illustrated. A time of 7 results in a DOM of 0.4 in the high time membership class and 0.2 in the medium time membership class.

These DOM values may in turn be used in the fuzzy logic implementation to derive a defined, "crisp" numerical value for the task dispatch index. For example, in the above example of FIGS. 11 and 12, the two propositional logic statements "fire" as follows:
1. If cost is medium and time is medium then dispatch task index is medium.
2. If cost is medium and time is high then dispatch task index is low.

The conjunctive relation "and" corresponds to the logical intersection of the two sets corresponding to the cost and time variables. In this case the appropriate DOM is the minimum DOM for each of the sets at the specified time. This is expressed algebraically as follows:

$$(A \cap B)(x) = \min(A(x), B(x)) \text{ for all } x \in X$$

Premises connected by an "OR" relationship are combined by taking the larger DOM for the intersection values. This is expressed algebraically as follows:

$$(A \cup B)(x) = \max(A(x), B(x)) \text{ for all } x \in X$$

In the case of the exemplary propositional logic equation 2 above: "If cost is medium and time is high then dispatch task index is low." The conjunctive relation "and" requires the use of the minimum value of the respective DOM's for cost and time. From the graphs (1201) and (1202) for this propositional logic equation, the corresponding DOM's are 0.67 for the cost variable and 0.4 for the time variable. Correspondingly, consider the propositional logic equation 1 above: "If cost is medium and time is medium then dispatch task index is medium." In this case the corresponding DOM's are 0.67 for the cost for the cost variable, and 0.2 for the time variable.

These values may be used to defuzzify low and medium ranges of the task dispatch index degree of memberships. As shown in (1203) of FIG. 12, fuzzy ranges for the time dispatch index may be defined in a similar manner to the cost and time variables. A numerical "crisp" value for the task dispatch index can now be derived using defuzzification procedures. As shown in FIG. 12, the DOM ranges for the task dispatch index are capped at values corresponding to the above analysis for the DOMs of the cost and time variables. The final "crisp" numerical value of the task dispatch index may be calculated based on the centroid of the geometric figure for the low and medium DOM ranges of the graph (1203) of FIG. 12. This calculation may be carried out by dividing the geometric figure of FIG. 12 into sub-areas A, each with known individual centroids $x_i$ from the following formula.

$$x_c = (\sum_{i=1}^{n} x_i A_i) / (\sum_{i=1}^{n} A_i)$$

The result of such a calculation is shown in FIG. 12 yielding a task dispatch index numerical value of 3.3.

Similar specific numerical values may be derived for other resources that may be potentially used to execute a particular task. Having derived these numerical indicators the resource or task execution agent with the highest task dispatch index may be selected to carry out the specific task.

While, for simplicity, the above example dealt with only two variables, namely time and cost, the method described above may be expanded to more than two variables for each of the individual resources or task execution agents being considered as candidates for execution of the specified task.

Figure 13:
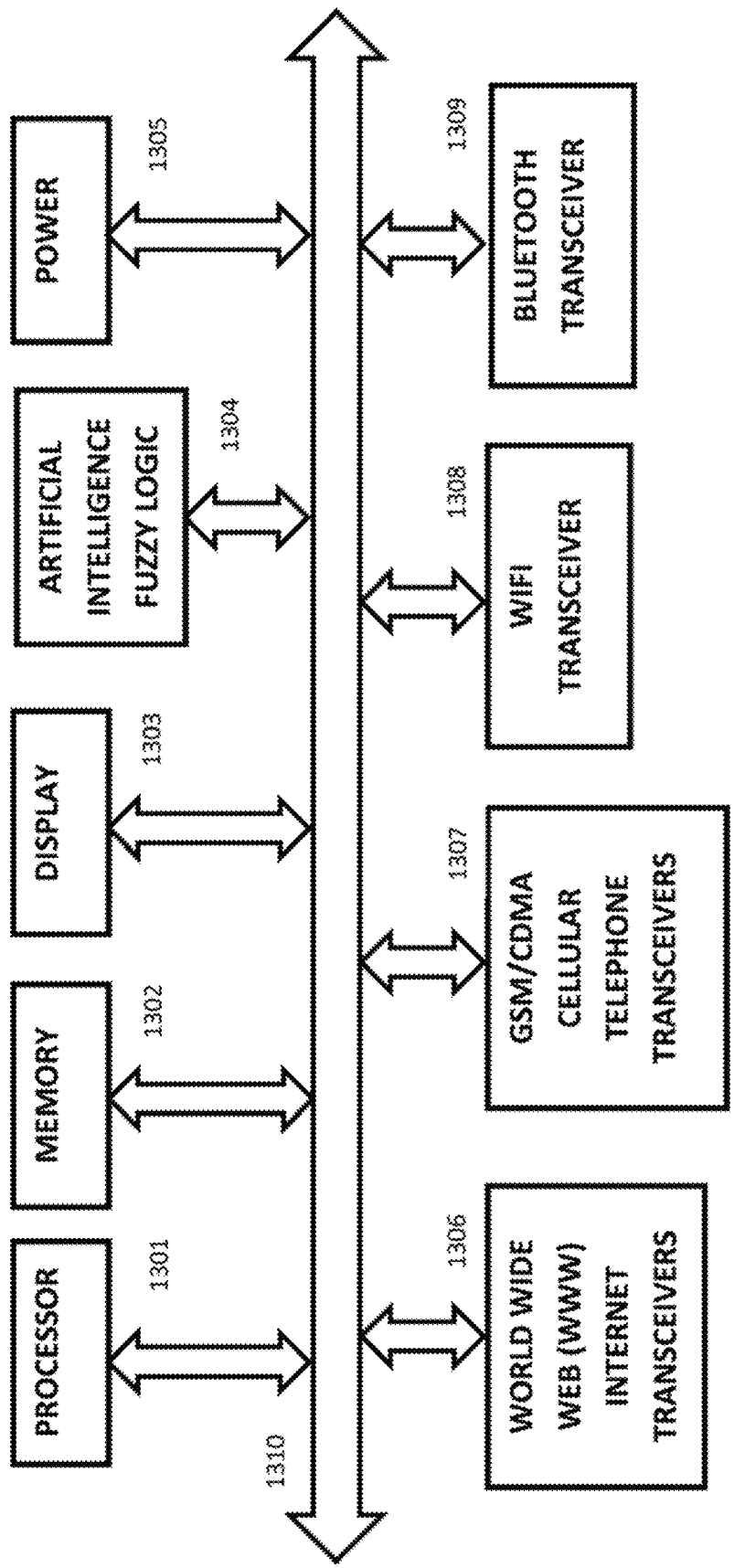
FIG. 13 illustrates, without limitation, an exemplary directed activity controller such as the controllers of FIG. 4.

FIG. 13 illustrates in more detail exemplary elements of a dynamic directed activity controller (404) of FIG. 4. As illustrated in FIG. 4, the dynamic directed activity control system of this invention may include multiple such direct connectivity controllers (404). The elements illustrated in FIG. 13 include a processor (1301) interconnected with other system elements via communication path (1310). The communication path (1310) may be for example an internal computer bus system for interconnecting the various elements illustrated in the figure. The dynamic directed activity controller includes a memory system (1302) which may be for example dynamic random access memory (DRAM), read only memory (ROM), disk storage, or other electronic memory elements. The dynamic directed activity controller also includes a display unit (1303) which may be, for example, a flat-screen LCD display, touch screen display, or other appropriate information displays.

FIG. 13 also illustrates an artificial intelligence control element (1304) interconnected with other elements via communication path (1310) as shown in the figure. The artificial intelligence element (1304) may be implemented, for example, using fuzzy logic as shown in the figure or other appropriate artificial intelligence technology as described in this patent disclosure. It is important to note the artificial intelligence/fuzzy logic element (1304) may also be implemented in software as part of the control programs executed on processor (1301) of FIG. 13.

Also illustrated in FIG. 13 is power source (1305) which may include batteries, connections to external power, solar power or other appropriate sources of computer power including protection for power surges and/or power outages.

Multiple exemplary communication network interfaces for the dynamic directed activity controller (1300) are also illustrated in FIG. 13. For example, the dynamic directed activity controller (1300) may be connected via the World Wide Web (WWW) Internet transceiver or transceivers (1306) for communications with other system elements, information sources or intended recipients of information. Similar exemplary connections are illustrated including GSM/CDMA cellular telephone transceivers (1307), Wi-Fi transceivers (1308) and/or Bluetooth transceivers (1309). All of these various transceivers and connections to external system elements or other external recipients or destinations of information may be encoded for secure transmission using signal encoders/decoders not separately illustrated in FIG. 13. In addition, error detection and/or error correction signal encoding and corresponding circuitry and/or software may be included to improve the performance of the communication links for the dynamic directed activity controller (1300) of FIG. 13. Other possible exemplary communication links to external recipients or destinations of information not shown in FIG. 13 may include, without limitation, satellite links, wireline links, fiber-optic links, cables, radio links, modem connections or other appropriate communication links.

Figure 14:
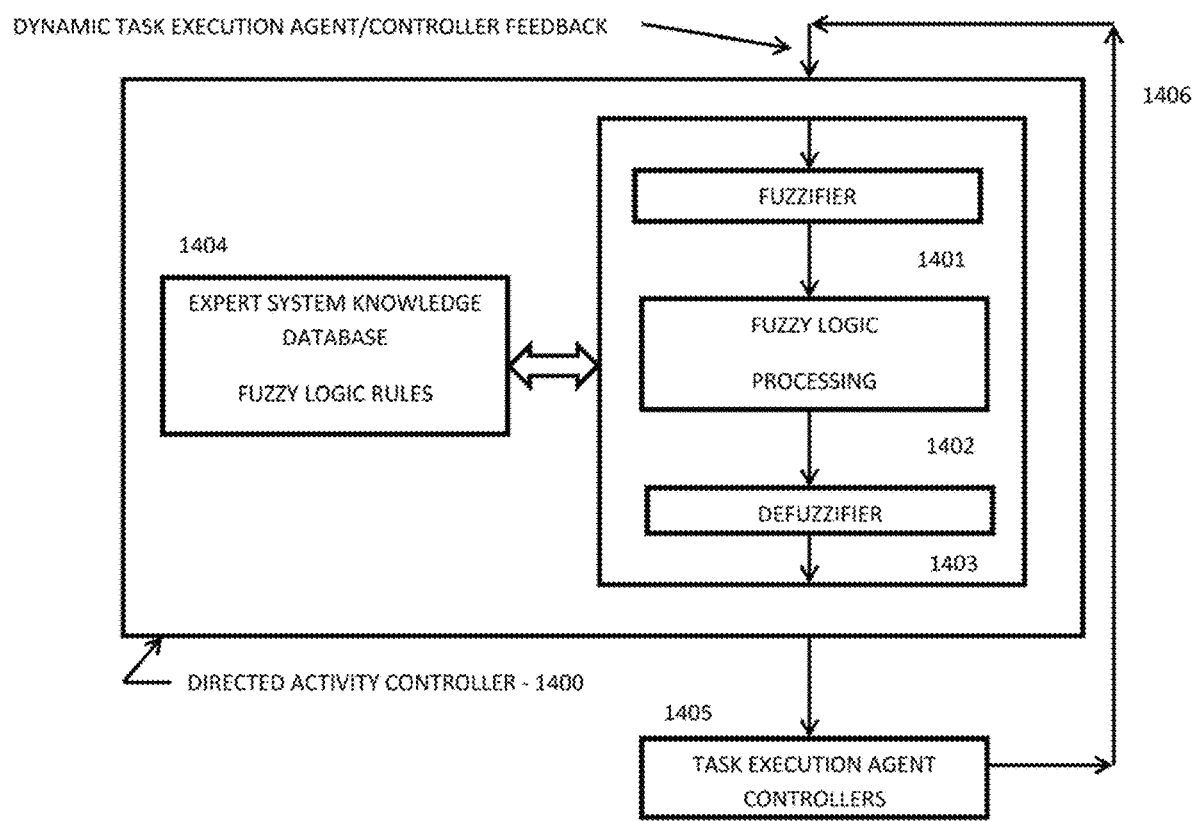
FIG. 14 illustrates, without limitation, in more detail exemplary operation of the artificial intelligence fuzzy logic unit of FIG. 13.

FIG. 14 illustrates in more detail exemplary fuzzy logic operation execution for the dynamic directed activity control system and method of this invention. Illustrated in the figure are exemplary fuzzy logic operations executed by the directed activity controller (1300). As shown in the figure these operations include access to the expert system knowledge base (1404) which may include the fuzzy logic rules as discussed above with example rules shown in FIG. 11. The fuzzy logic operations include the fuzzifier (1401) used to establish degree of memberships (DOMs) as discussed above and illustrated in FIG. 12. The outputs of fuzzifier (1401) are fed to the fuzzy logic processing element (1403). Defuzzifier (1403) provides crisp numerical outputs for the task dispatch index is illustrated in FIG. 12.

As shown in FIG. 14 and discussed above, the outputs of the expert system/fuzzy logic control process are used to select appropriate task execution agents based on the values of the task dispatch indices for each of potentially several possible task execution agents. Appropriate control messages are dispatched to the task execution agent controllers (1405) to initiate appropriate task execution activities. As also illustrated in FIG. 14, the task execution agent controllers provide feedback via path (1406) to the directed activity controller. Information provided may include, for example, changes in variables associated with individual task execution agents including, for example, agent location, availability, utilization, cost, execution time, or other variables descriptive of task execution operations as discussed above. These variables may change over time enabling dynamic and improve performance of the dynamic activity control system of this invention.

The above described implementation of the dynamic directed activity control system and method of this invention may result in a system state where multiple of the tasks A-H are ready for execution based on their precedents requirements but may be competing for the same execution agent resource for completion of the respective tasks. The question then arises as to which task from the multiple tasks awaiting execution should be first executed. Such decisions may be based on preassigned task priorities. Alternatively, or in addition, selection of task execution order in this situation may be based on the total amount of time required to execute the tasks following an individual task. In this way, the dynamic directed activity control system and method will free-up the set of subsequent tasks with the maximum total required execution time. A mathematical approach to making such time-based selection of one task from among many tasks ready for execution and requiring the same task execution agent resource is described below.

The directed activity control program of FIG. 2 is topologically a directed graph or digraph. In the directed activity control program of FIG. 2, each of the tasks A-H corresponds to nodes of a directed graph or digraph. Such digraphs can be characterized and studied using matrix theory. For example, a digraph with n nodes may be described in terms of its (n×n) adjacency matrix, A(D), defined as follows:

$$A(D)=[a_{ij}], 1 \leq i \leq n; \ 1 \leq j \leq n.$$

In this equation, $a_{ij}=1$ when task "i" immediately precedes task "j" as indicated in the corresponding digraph by a directed edge from task "i" to task "j" and $a_{ij}=0$ otherwise.

FIGS. 15 and 16 illustrate matrices and vectors corresponding to the digraph of FIG. 2 and useful in making the above-described decision for time-based selection of one task from among many tasks ready for execution and requiring the same task execution agent resource. The corresponding adjacency matrix (1501) for A(D) is set forth in FIG. 15. For example, the directed edge from node A to B of FIG. 2 corresponds to the numeral 1 in the first row and second column of the matrix (1501). The directed edge from node A to C of FIG. 2 corresponds to the numeral 1 in the first row and third column of the matrix (1501) and so forth. A(D) is an 8×8 matrix corresponding to the eight task nodes of FIG. 2.

$A^2(D)$ shown at (1502) in FIG. 15 results from the matrix multiplication of the matrix A(D) by itself. The entries in $A^2(D)$ corresponding to the number of paths of length 2 in the dynamic directed activity control system digraph of FIG. 2. For example, there is one path of length 2 from the node corresponding to task C to the node corresponding to task G. There are two paths of length 2 from the node corresponding to task C to the node corresponding to task H.

$A^3(D)$ shown at (1503) in FIG. 15 results from matrix multiplication of $A^2(D)$ and A(D). The entries in $A^3(D)$ correspond to the number of paths of length 3 in the dynamic directed activity control system digraph of FIG. 2. For example, there is one path of length 2 from the node corresponding to task A to the node corresponding to task G. There are 2 paths of length 3 from the node corresponding to task A to the node corresponding to task G.

$A^4(D)$ shown at (1504) in FIG. 15 results from matrix multiplication of $A^3(D)$ and A(D). The entries in $A^4(D)$ correspond to the number of paths of length 4 in the dynamic directed activity control system digraph of FIG. 2. For example, there are 2 paths of length 4 from the node corresponding to task A to the node corresponding to task G.

A particularly useful matrix in making the above described time-based selection of one task from among many tasks ready for execution and requiring the same task execution agent resource is the reachability matrix R(D). The reachability matrix R(D) is also an (n×n) matrix with entries corresponding to all nodes of the digraph that are reachable from each given node. The reachability matrix R(D) can be computed using the adjacency matrices (1501) to (1504) of FIG. 15. Mathematically R(D) is equal to the binary sum of the adjacency matrices (1501) to (1504) expressed as follows where the # symbol indicates a binary summation of the respective matrices.

$$R(D)\#=\{A(D)+A^2(D)+A^3(D)+A^4(D)\}\#$$

More generally, the reachability matrix R(D)# for a digraph with p nodes is given by the by the binary sum $$R(D)\#=\{A(D)+A^2(D)+A^3(D)+A^4(D)+\ldots+A^{p-1}(D)\}\#$$

In the case of the dynamic directed activity control digraph of FIG. 2 there are eight nodes but no paths of length greater than four.

The resulting R(D)# matrix is shown in FIG. 16 at (1601). As can be seen, for example, all of the nodes B through H are reachable from node A. As can also be seen from the reachability matrix (1601) nodes F and G are reachable from node B and so forth.

The entries in the rows of the reachability matrix R(D)# correspond to all nodes reachable from the respective nodes corresponding to the rows of the matrix as shown in the matrix (1601) of FIG. 16. Consider now the task execution time vector (1602) of FIG. 16. Entries in this vector correspond to projected execution times for a given task execution agent for each of the respective tasks A through H. Using matrix multiplication to multiply the directed activity precedence matrix (1601) times the task execution time vector (1602) results in the time index vector (1603) of FIG. 16.

The entries in the time index vector (1603) of FIG. 16 correspond to the total time required to execute all tasks of the dynamic directed activity control system program of FIG. 2 that depend upon the completion of each of the respective tasks A through G corresponding to the rows of the matrix (1603). For example, tasks F and G depend upon completion of task B with a required total execution time for tasks F and G of 10 units. Similarly, task D, E, G and H all require the completion of task C and have a total execution time of 24 time units.

By way of example, if tasks B and C are competing for the same task execution resource, selection of task C to complete first would free up subsequent tasks with more total required execution time than would occur if task B were selected for first execution. Using this selection criteria ensures that the subsequent tasks remaining to be executed with the required maximum total execution time will be made available for execution.

While the examples of FIG. 16 are with respect to a single directed activity control program of the type illustrated in FIG. 2, multiple such control programs may be executed simultaneously by the dynamic directed activity control system of this invention. With such multiple control program execution it may occur that multiple tasks from separate control programs are simultaneously available for execution. The same calculations and methods of FIG. 16 may be made concurrently for multiple control programs to determine which of the tasks from those multiple control programs should be selected.

In some cases probability theory may also be used to supplement these results, for example, for the calculation of expected waiting times and the variances of those waiting times to gain access to particular resources for execution of tasks in the overall system. Consider for example a particular task execution agent (301) of FIG. 3. In operation of the distributed activity control system of this invention it may happen the multiple tasks such as tasks A(201) through G(207) of FIG. 2 may encounter queues of waiting tasks to be executed at individual task execution agents (401) indicated in FIG. 4. The task execution controllers (402) and/or associated directed activity controllers (404) of FIG. 4 may maintain a history database files of execution times for successive assigned tasks. Using this history file these individual controllers may compute the average time required to complete the success of tasks. For example with a history database of execution times for N tasks with individual execution times of $T_i$ the average required execution time will be:

$$T_A = (\sum_{i=1}^{N} T_i)/N.$$

In some cases it may be appropriate to add a multiple of this average execution time TA corresponding to the number of waiting tasks to the expected execution time for an individual task such as the tasks A through H of the task execution time vector (1602) of FIG. 16 to obtain more accurate estimates of the total required time for completion of a particular task by given task execution agent.

Another parameter that may be of interest in a given implementation of the dynamic directed activity control system and method of this invention is the probability of waiting longer than a specified time "t" to gain access to a specific task execution agent (301) of FIG. 3. Assuming the waiting time "t" is a nonnegative random variable, the probability distribution function F(t) expresses the probability that the random variable is less than or equal to the argument of the function, t. It follows that the probability of waiting longer than a time period TW is equal to:

Probability of waiting longer than $Tw=1-F(T_w)$.

These and other statistical and probability functions known to those of skill in the art may be incorporated into the dynamic directed activity control system and methods described in this invention.

The above describes applications of expert systems, fuzzy logic, graph theory, matrix theory, statistics and probability theory in the implementation of a dynamic directed activity control system. These disciplines may be used individually or in combination as described above.

Although the embodiments above have been described in considerable detail, numerous variations and modifications will become apparent to those skilled in the art once the above disclosure is fully appreciated. It is intended that the following claims be interpreted to embrace all such variations and modifications.

The embodiments of the invention in which an exclusive property or privilege is claimed are defined as follows:

1. An Artificial intelligence (AI) Expert System method of dynamically controlling execution of interrelated distributed tasks comprising a cloud-based data processing and storage system and further comprising internet and World-Wide-Web (www) connection and access to computers, data storage, data files, task execution agents and task execution controllers with at least one specialized computer and further comprising:
    storing in memory one or more interrelated distributed task expert defined artificial intelligence control programs comprising digital workflow instructions for control of execution of interrelated tasks including task precedence requirements, task input and output object workflow information, permitted parallelism in task execution, task adjacency to subsequent tasks, and reachability from each task to other tasks;
    storing in memory artificial intelligence expert system digital model file histories comprising potentially dynamically changing task execution agent attributes describing task execution agent characteristics and operational status including maintenance histories and scheduled maintenance requirements, and further comprising task execution times, task waiting times, task execution agent availability, and task execution cost;
    storing in memory artificial intelligence expert system defined multivariable workflow propositional logic rules defining task execution agent asset attribute ranges and threshold values for triggering activities depending on said task execution agent asset attribute values;
    selecting one task from among multiple tasks ready for execution and requiring the same task execution agent based on artificial intelligence propositional logic rule analysis and on the required maximum total execution time for subsequent tasks as determined by said task precedence requirements and task execution times;
    communicating over the internet with OFDM (orthogonal frequency division multiplexing) transceivers comprising one or more of cellular telephones, tablets, laptop computers, and/or special purpose controllers for internet and World-Wide-Web (www) connection and access to computers, data storage, data files, task execution agents and task execution controllers;
    receiving via OFDM transceivers information for updating said digital model history files and statistical analysis of potentially dynamically changing task execution attributes stored in digital model history files based on information in received messages from said task execution agent;
    transmitting via OFDM transceivers one or more control messages to at least one selected internet accessible distributed task execution agent to direct execution of particular tasks; and
    whereby improved task execution agent utilization efficiency is achieved based on received potentially dynamically changing task execution status message information and artificial intelligence expert system derived decisions directing execution of said interrelated distributed tasks.

2. The method of claim 1 further providing OFDM transceiver operation in multipath environments wherein interfering signals may arrive at a transceiver from multiple directions caused by signal reflections from intervening structures in the transmission path.

3. The method of claim 2 wherein said intervening structures comprise buildings with intervening interior or exterior structures, or metropolitan areas with multiple large buildings and structures that give rise to OFDM interfering signal reflections.

4. The method of claim 1 wherein said OFDM transceivers comprise integrated circuit technology, digital implementation, and direct conversion receiver structures.

5. The method of claim 4 further comprising OFDM direct conversion transceiver structures operating without intermediate frequency down conversion and intermediate frequency filter implementations that require external components and prohibitive space for miniature implementation.

6. The method of claim 1 further comprising OFDM transceiver signaling and modulation formats using combinations of frequency modulation, phase modulation and amplitude modulation with multilevel signaling to increase the number of data bits transmitted per symbol time.

7. The method of claim 1 further comprising OFDM Wi-Fi transceivers.

8. The method of claim 7 further comprising OFDM Wi-Fi transceivers use of frequency modulation (FM), amplitude modulation (AM), phase modulation (PM), or variations of these methods with multilevel signaling to increase the number of data bits transmitted per symbol time.

9. The method of claim 7 further comprising OFDM Wi-Fi transceivers communicating with or between said task execution controllers or task execution agents.

10. The method of claim 1 providing internet communications with OFDM transceivers and further additionally providing internet connections with fiber optic cables.

11. The method of claim 1 further providing fuzzy logic digital model artificial intelligence expert system analysis based on said workflow propositional logic rules and further comprising:
fuzzy logic load balancing based on the status of said task execution agent comprising task execution agent capabilities, availability and utilization, and further based on occurrence of predetermined events comprising particular dates and/or times, completion of other control programs, permitted parallelism in task execution, defined task adjacency, or changes in system operational status;
fuzzy logic derivation of indices of desirability of using particular possible task execution agents capable of executing a particular task based at least in part on said task precedence requirements, task input and output object workflow information, permitted parallelism in task execution, task adjacency to subsequent tasks, and reachability from each task to other tasks; and
fuzzy logic designation of a particular internet accessible task execution agent selected from multiple such task execution agents for executing a particular task based on comparisons of selected of said indices of desirability with said digital model artificial intelligence expert system analysis.

12. The method of claim 11, further providing relative measurements of task execution agent attributes execution parameters including time required by a particular task execution agent to execute a particular task or the cost of using said task execution agent for a particular task.

13. The method of claim 12, wherein said relative measurements comprise defined fuzzy sets with possible overlapping parameter ranges.

14. The method of claim 13 wherein said relative measurements of defined fuzzy sets comprise task execution agent attributes execution parameters and further comprise specialized computer artificial intelligence expert system decision making capability with derivation of artificial intelligence fuzzy logic decisions based on calculation of a degree of membership in defined fuzzy sets for particular task execution agent attributes.

15. The method of claim 13, further comprising defuzzifying multiple fuzzy logic degree of membership results to derive crisp numerical task dispatch indices values for the use of particular task execution agents to execute particular tasks.

16. The method of claim 15, further comprising selecting a particular task execution agent from among multiple such task execution agents to execute a particular task by comparing said fuzzy logic derived crisp numerical task dispatch indices values for considered task execution agents.

17. The method of claim 1 further comprising statistical analysis of the digital model history files of sample times required to execute a particular task with a particular task execution agent and further comprising computation of the average time to execute said particular task.

18. The method of claim 17 wherein the statistical analysis of the digital model history files of sample times required to execute a particular task with a particular task execution agent further comprises computation of the average waiting time and the probability of waiting longer than a specified time to gain access to a specific task execution agent.

19. The method of claim 17 wherein the statistical analysis of the digital model history files of sample times required to execute a particular task with a particular task execution agent further comprises adding a multiple of the average waiting times corresponding to the number of waiting tasks to obtain an estimate of the total required average time for completion of a particular task by a particular task execution agent.

20. The method of claim 17 wherein the statistical analysis of the digital model history files of sample times required to execute a particular task with a particular task execution agent further comprises computation of the variance of the waiting time to execute said particular task and further comprising determination of the multiple of average waiting times based on a computed statistical variance of said average waiting times measurements.

* * * * *